(12) United States Patent
Uchida

(10) Patent No.: US 9,178,794 B2
(45) Date of Patent: Nov. 3, 2015

(54) COMMUNICATION QUALITY MONITORING SYSTEM, COMMUNICATION QUALITY MONITORING METHOD AND RECORDING MEDIUM

(75) Inventor: Satoshi Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 13/818,087

(22) PCT Filed: Jul. 15, 2011

(86) PCT No.: PCT/JP2011/066231
§ 371 (c)(1),
(2), (4) Date: Feb. 20, 2013

(87) PCT Pub. No.: WO2012/029422
PCT Pub. Date: Mar. 8, 2012

(65) Prior Publication Data
US 2013/0148537 A1  Jun. 13, 2013

(30) Foreign Application Priority Data
Aug. 30, 2010 (JP) ................ 2010-192490

(51) Int. Cl.
H04L 12/26 (2006.01)
H04L 12/24 (2006.01)

(52) U.S. Cl.
CPC ............ *H04L 43/50* (2013.01); *H04L 41/5009* (2013.01); *H04L 41/5025* (2013.01); *H04L 43/12* (2013.01); *H04L 41/06* (2013.01); *H04L 41/12* (2013.01)

(58) Field of Classification Search
None
See application file for complete search history.

(56) References Cited

U.S. PATENT DOCUMENTS

| 5,781,527 A | 7/1998 | Read et al. |
| 2004/0064293 A1* | 4/2004 | Hamilton et al. ............. 702/182 |

(Continued)

FOREIGN PATENT DOCUMENTS

| CN | 1168752 A | 12/1997 |
| CN | 1881862 A | 12/2006 |

(Continued)

OTHER PUBLICATIONS

International Search Report in PCT/JP2011/066231 dated Sep. 27, 2011 (English Translation Thereof).

(Continued)

*Primary Examiner* — Ayaz Sheikh
*Assistant Examiner* — Peter Chau
(74) *Attorney, Agent, or Firm* — McGinn IP Law Group, PLLC

(57) ABSTRACT

Conventional network quality monitoring systems require high monitoring cost, because: physical maintenance cost is high, since monitors are required to install on many portion of the network; the number of monitoring flows is apt to increase; the cost for information synchronization between monitors is required; and the network cost to collect information from apparatuses is required. In the present invention, based on a network whose route is definable by an external controller and changing the monitoring flow route appropriately, it is possible to perform monitoring of the communication quality under a small number of monitoring terminals and flows. Further, the role of the monitoring flow is divided into the monitoring flows to monitor the quality degradation occurrence and to specify the quality degradation point. The former is used for normal time, and the latter is for the quality degradation time. Consequently, the network monitoring system reducing the cost is proposed.

14 Claims, 22 Drawing Sheets

(56) References Cited

U.S. PATENT DOCUMENTS

| | | | |
|---|---|---|---|
| 2005/0081116 A1* | 4/2005 | Bejerano et al. | 714/47 |
| 2005/0099955 A1* | 5/2005 | Mohan et al. | 370/242 |
| 2006/0190620 A1 | 8/2006 | Kobayashi | |
| 2007/0036544 A1* | 2/2007 | Fukashiro et al. | 398/19 |
| 2007/0258476 A1* | 11/2007 | Habu et al. | 370/410 |
| 2009/0135727 A1* | 5/2009 | Agrawal et al. | 370/248 |
| 2009/0213746 A1* | 8/2009 | Ariyoshi et al. | 370/252 |
| 2009/0323537 A1* | 12/2009 | Yamamoto et al. | 370/242 |
| 2010/0034098 A1* | 2/2010 | Wang et al. | 370/242 |
| 2010/0049460 A1 | 2/2010 | Hasegawa et al. | |
| 2010/0100768 A1* | 4/2010 | Yamamoto et al. | 714/32 |
| 2010/0157818 A1 | 6/2010 | Kobayashi | |
| 2010/0208595 A1* | 8/2010 | Zhao et al. | 370/242 |
| 2010/0309777 A1* | 12/2010 | Kano | 370/218 |
| 2010/0322081 A1* | 12/2010 | Yasuie et al. | 370/242 |
| 2011/0096678 A1* | 4/2011 | Ketonen | 370/252 |
| 2011/0158105 A1* | 6/2011 | Duffield et al. | 370/242 |
| 2011/0231545 A1 | 9/2011 | Enomoto et al. | |
| 2012/0224490 A1* | 9/2012 | Ikada | 370/242 |
| 2013/0013807 A1* | 1/2013 | Chrapko et al. | 709/238 |

FOREIGN PATENT DOCUMENTS

| | | |
|---|---|---|
| JP | 02-252340 A | 10/1990 |
| JP | 2004-104540 A | 4/2004 |
| JP | 2006-128846 A | 5/2006 |
| JP | 2011-124897 A | 6/2011 |
| WO | WO 2006/137373 A1 | 12/2006 |
| WO | WO 2006137373 A1 * | 12/2006 |
| WO | WO 2010/064532 (A1) | 6/2010 |

OTHER PUBLICATIONS

Masayoshi Kobayashi and Tutomu Murase, "Accurate elimination of non-degraded links in locating QoS degradation", Technical Report of the Institute of Electronics, Information and Communication Engineers, vol. 105, No. 628IN2005-197, Mar. 2006, pp. 243-248.

"OpenFlow Switch Specification, Version 1.0.0", [online], Dec. 31, 2009, retrieval on May 16, 2011, the Internet (URL:http//www.openflowswitch.org/documents/openflow-spec-v1.0.0.pdf).

Yoichi Hatano, Yasuhiro Yamasaki and Hideyuki Shimonishi, "An Efficient Measurement Flow Placement for QoS Degradation Locating on OpenFlow-based Network", Technical Report of the Institute of Electronics, Information and Communication Engineers, vol. 109, No. 448 NS 2009-166, Mar. 2010, pp. 25-30.

Nick McKeown, et al., "OpenFlow; Enabling Innovation in Campus Networks", [online], retrieval on Jun. 3, 2010, the Internet (URL: http://www.openflowswitch.org/documents/openflow-wp-latest.pdf).

PCT/ISA/237 ( English translation dated Mar. 12, 2013, of written opinion of the international searching authority, dated Sep. 27, 2011, in International Application No. PCT/JP2011/066231).

PCT/IB/373.

Japanese Office Action dated Feb. 20, 2015, with a partial English translation.

T. Watanabe, "Locating Degraded Elements in the IP Network Based on an Active Measurement of End-to-End IP Path Quality Information", IEICE Technical Report, Japan, The Institute of Electronics, Information and Communication Engineers, Mar. 4, 2010, vol. 109, No. 463, pp. 87-92.

Chinese Office Action dated Nov. 15, 2014 with an English translation thereof.

Japanese Office Action dated Jun. 16, 2015 with a partial English translation.

* cited by examiner

Fig. 4B
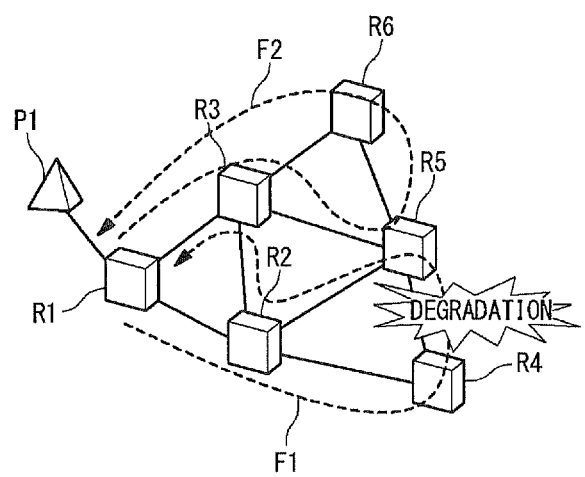
| | Flow ID | L1 | L2 | L3 | L4 | L5 | L6 | L7 | L8 | L9 |
|---|---|---|---|---|---|---|---|---|---|---|
| Depleted | F1 | 1 | 1 | 1 | 1 | 1 | | | 1 | |
| No-Problem | F2 | | 1 | | | | 1 | 1 | | 1 |
ESTIMATION OF QUALITY DEGRADATION POINT ⇒ L4, L5, L8

Fig. 4C
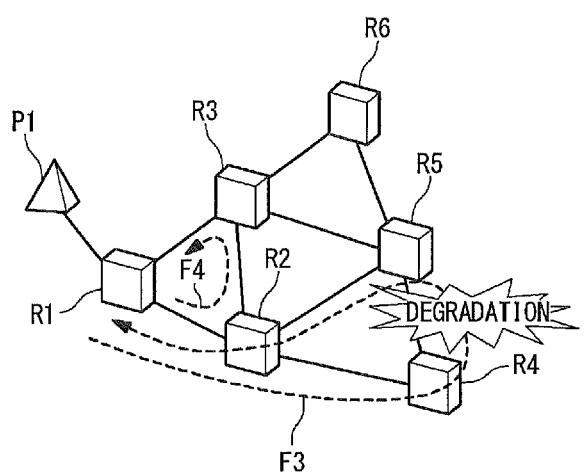
| | Flow ID | L1 | L2 | L3 | L4 | L5 | L6 | L7 | L8 | L9 |
|---|---|---|---|---|---|---|---|---|---|---|
| Depleted | F1 | 1 | 1 | 1 | 1 | 1 | | | 1 | |
| | F3 | 1 | | | 1 | 1 | | | 1 | |
| No-Problem | F2 | | 1 | | | | 1 | 1 | | 1 |
| | F4 | 1 | 1 | 1 | | | | | | |
ESTIMATION OF QUALITY DEGRADATION POINT ⇒ L4, L5, L8

Fig. 4D
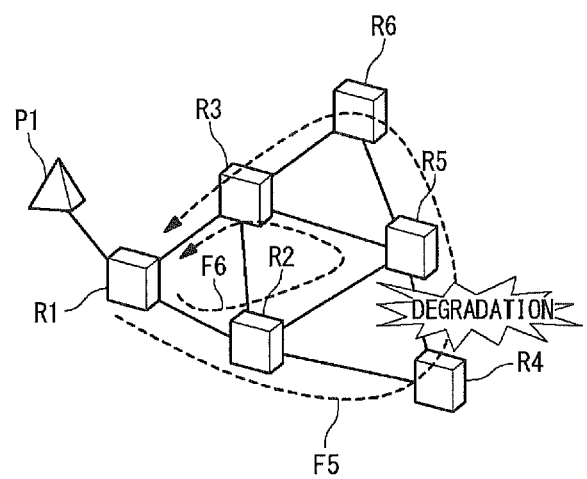
| | Flow ID | L1 | L2 | L3 | L4 | L5 | L6 | L7 | L8 | L9 |
|---|---|---|---|---|---|---|---|---|---|---|
| Depleted | F1 | 1 | 1 | 1 | 1 | 1 | | | 1 | |
| | F3 | 1 | | | 1 | 1 | | | 1 | |
| | F5 | 1 | 1 | | 1 | | | 1 | 1 | 1 |
| No-Problem | F2 | | 1 | | | | 1 | 1 | | 1 |
| | F4 | 1 | 1 | 1 | | | | | | |
| | F6 | 1 | 1 | | | 1 | 1 | | | |
ESTIMATION OF QUALITY DEGRADATION POINT⇒L4, L8

Fig. 4E
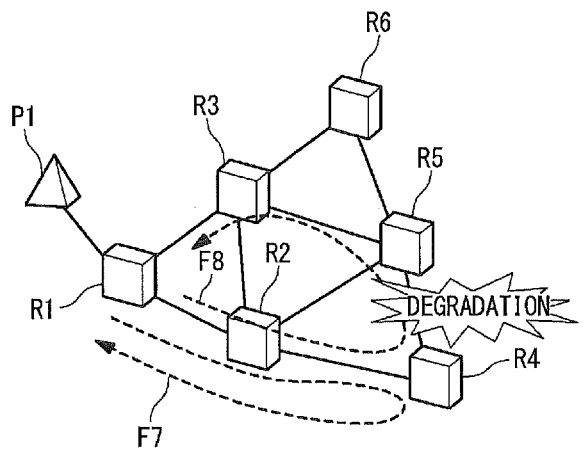
| | Flow ID | L1 | L2 | L3 | L4 | L5 | L6 | L7 | L8 | L9 |
|---|---|---|---|---|---|---|---|---|---|---|
| Depleted | F1 | 1 | 1 | 1 | 1 | 1 | | | 1 | |
| | F3 | 1 | | | 1 | 1 | | | 1 | |
| | F5 | 1 | 1 | | 1 | | | 1 | 1 | 1 |
| | F8 | 1 | 1 | | 1 | | 1 | | 1 | |
| No-Problem | F2 | | 1 | | | | 1 | 1 | | 1 |
| | F4 | 1 | 1 | 1 | | | | | | |
| | F6 | 1 | 1 | | | 1 | 1 | | | |
| | F7 | 1 | | | 1 | | | | | |
ESTIMATION OF QUALITY DEGRADATION POINT
⇒L8 (COMPLETION OF IDENTIFICATION OF DETAILED POINT)

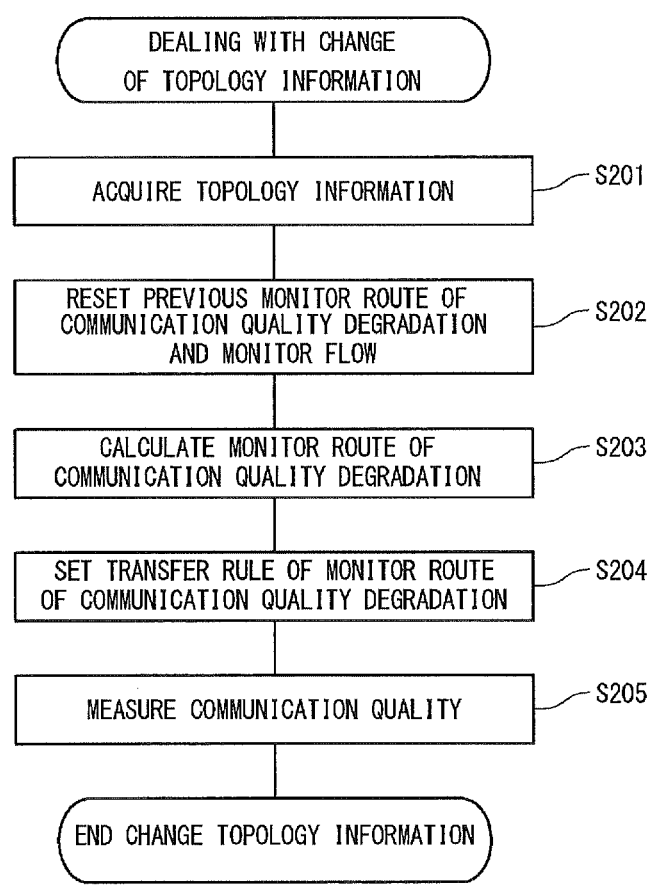

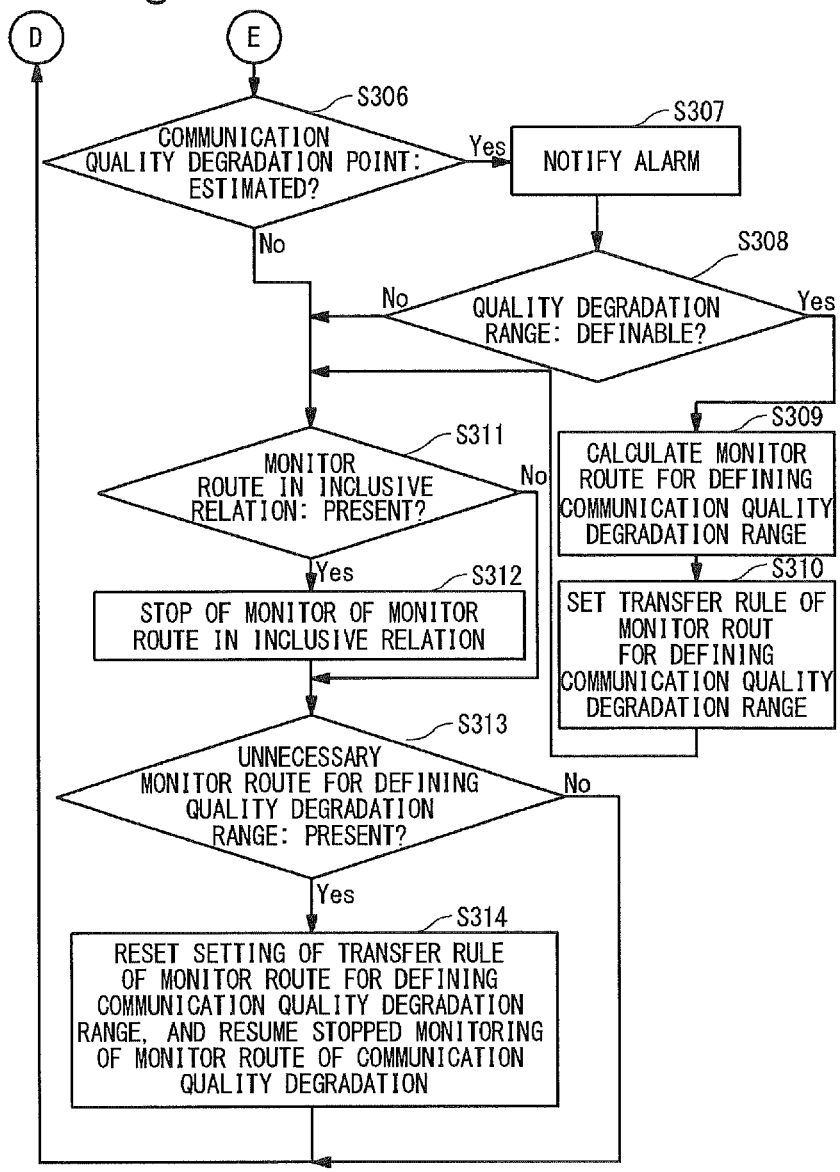

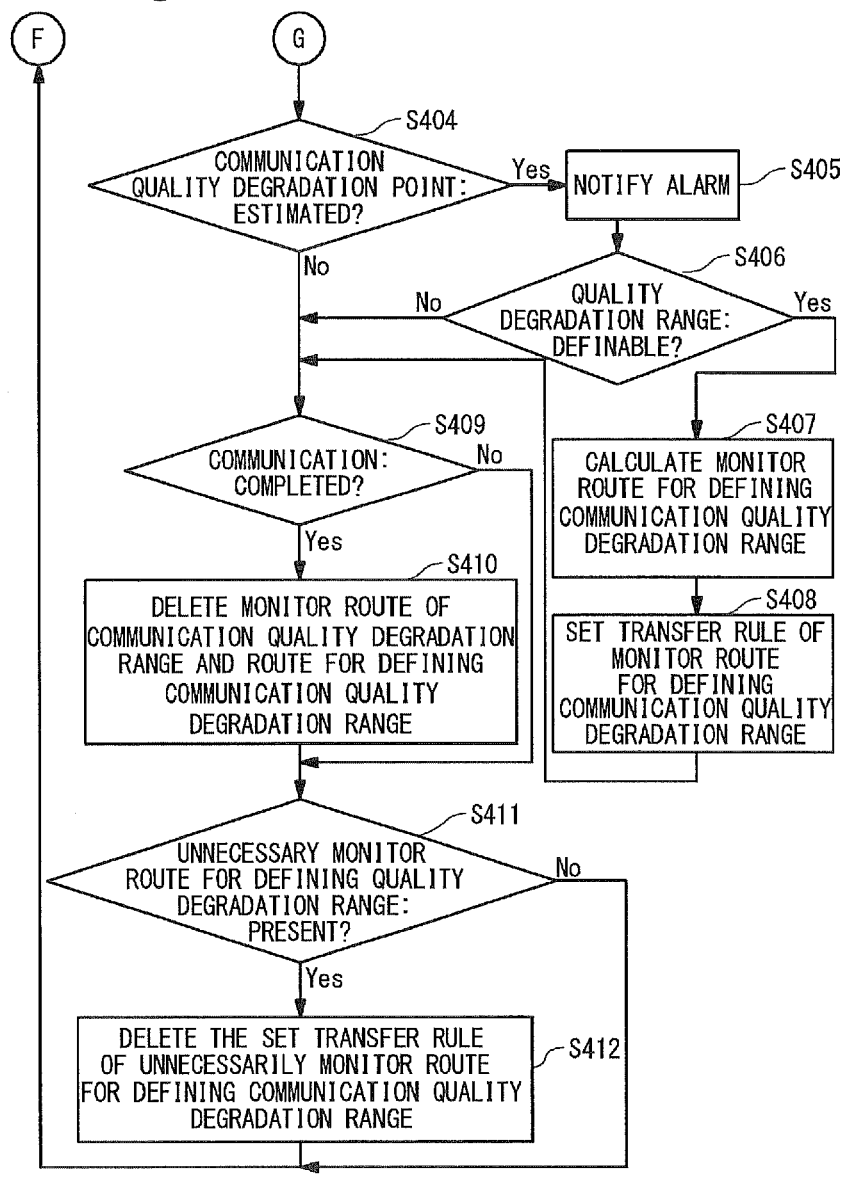

Fig. 10B
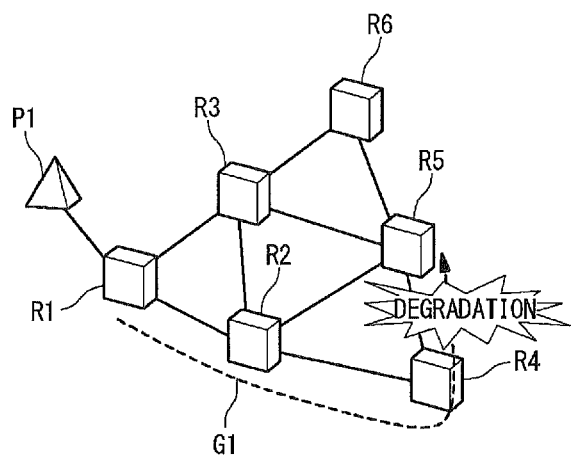
| | Flow ID | L1 | L2 | L3 | L4 | L5 | L6 | L7 | L8 | L9 |
|---|---|---|---|---|---|---|---|---|---|---|
| Depleted | G1 | 1 | | | 1 | | | | 1 | |
| No-Problem | | | | | | | | | | |
ESTIMATED QUALITY DEGRADATION POINT ⇒ L1, L4, L8

Fig. 10C
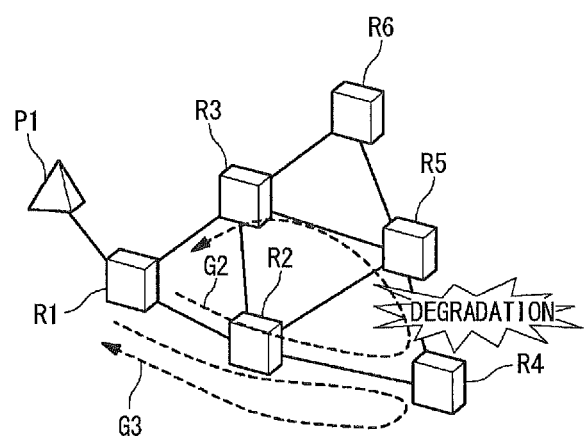
| | Flow ID | L1 | L2 | L3 | L4 | L5 | L6 | L7 | L8 | L9 |
|---|---|---|---|---|---|---|---|---|---|---|
| Depleted | G1 | 1 | | | 1 | | | | 1 | |
| | G2 | 1 | 1 | | 1 | | 1 | | 1 | |
| No-Problem | G3 | 1 | | | 1 | | | | | |
ESTIMATED QUALITY DEGRADATION POINT⇒
L8 (COMPLETION OF IDENTIFICATION OF DETAILED POINT )

COMMUNICATION QUALITY MONITORING SYSTEM, COMMUNICATION QUALITY MONITORING METHOD AND RECORDING MEDIUM

TECHNICAL FIELD

The present invention relates to a communication quality monitoring system and more particularly relates to a communication quality monitoring system in a network that is formed by using a packet transfer apparatus in which a packet transfer route can be controlled from an external controller.

BACKGROUND ART

In the non-patent literature 1 and the patent literature 1, an example of a conventional communication quality monitoring system is described.

The non-patent literature 1 describes a method of the technique that is referred to as the network tomography. In this method, a plurality of communication quality measuring apparatuses, each of which is referred to as a probe terminal, are installed on a network system for inferring a degradation point of a communication quality.

Further, in the patent literature 1, in order to enable monitoring of a large scale network system, a means is prepared, in which a tree-type network is assumed, and a delay cause portion is narrowed down for collecting the operational information of network apparatus in the cause portion.

Other than the above techniques, the non-patent literature 2 describes the OpenFlow framework as a new network framework.

The OpenFlow framework consists of OpenFlow switches and OpenFlow Controller. An OpenFlow switch inquires forwarding rules (rule and action) of a packet to an OpenFlow controller. An OpenFlow controller senses a network state, calculates communication paths of packets, determines forwarding rules of the packets, and then sets their forwarding rules into OpenFlow switches. An OpenFlow Controller and OpenFlow Switches are connected through a Secure Channel so that the OpenFlow Controller controls the OpenFlow Switch by using a control message based on an OpenFlow protocol. This enables a control algorithm, new ideas and the like are mounted thereon, to be easily applied to a network environment.

The OpenFlow Switches are edge switches and core switches, which are controlled by an OpenFlow controller in OpenFlow network. Flow shows a communication in specified path, which is a transfer from incoming a packet to the input side edge switch to sending it from the output side edge switch.

The forwarding rule is defined by various combinations of one or all of a destination address (Destination Address), a transmission source address (Source Address), a destination port (Destination Port) and a transmission source port (Source Port) that are included in the header region of each protocol hierarchy level in the packet and can be distinguish from other forwarding rules. In the above addresses, it is assumed that a MAC address (Media Access Control Address) and an IP address (Internet Protocol Address) are included. Further, in addition to the above, the information of an ingress port (Ingress Port) can be used as the transfer rule.

The action of the transfer rule indicates the operations such as "outputting to a particular port", "discarding" and "rewriting of a header". For example, if the identification information of an output port (the number of the output port or the like) is indicated in the action of a flow entry, the OpenFlow Switch outputs the packet to the port corresponding to the indication information, and if the identification information of the output port is not indicated, the OpenFlow Switch discards the packet. Or, if header information is indicated in the action of a flow entry, the OpenFlow switch rewrites the header of the packet on the basis of the header information.

The OpenFlow switch executes the action of the flow entry, for a packet group (a packet series) complying with the rule of the flow entry.

The details of the OpenFlow technique are described in the non-patent literature 3.

In the non-patent literature 4, a network tomography technique that uses this OpenFlow Framework is described. In the non-patent literature 4, since a monitoring route can be set, a route for comprehensively monitoring the network from a small number of probe terminals is determined, set, and monitored, and consequently, the communication quality can be monitored by the small number of probe terminals.

A problem of conventional monitoring systems is the high monitoring cost. This is caused by the fact that in many monitoring systems, a monitoring function must be installed for all of the terminals and all of the edge terminals in the network. Further, many monitoring routes are required to be set for the respective monitoring functions. For example, though the technique described in the non-patent literature 4 has a merit that the monitoring function can be reduced, in order to enable the network to be comprehensively observed, many monitoring routes are required to be set, which leads to a result that many monitoring packets flow.

Moreover, because many monitoring routes are set, the network load for information synchronization and information collection is required.

CITATION LIST

Patent Literature

[PTL 1] Japanese Patent Application Publication JP2004-104540A

Non-Patent Literature

[NPTL 1] Masayoshi Kobayashi and Tutomu Murase, "Accurate elimination of non-degraded links in locating QoS degradation", Technical Report of the Institute of Electronics, Information and Communication Engineers, Vol. 105, No. 6281N2005-197, March 2006, pp. 243-248.

[NPTL 2] Nick McKeown, et al., "OpenFlow; Enabling Innovation in Campus Networks", [online], retrieval on Jun. 3, 2010, the Internet (URL: http://www.openflowswitch.org//documents/openflow-wp-latest.pdf).

[NPTL 3] "OpenFlow Switch Specification, Version 1.0.0", [online], Dec. 31, 2009, retrieval on May 16, 2011, the Internet (URL: http//www.openflowswitch.org/documents/openflow-spec-v1.0.0.pdf).

[NPTL 4] Yoichi Hatano, Yasuhiro Yamasaki and Hideyuki Shimonishi, "An Efficient Measurement Flow Placement for QoS Degradation Locating on OpenFlow-based Network", Technical Report of the Institute of Electronics, Information and Communication Engineers, Vol. 109, No. 448 NS 2009-166, March 2010, pp. 25-30.

SUMMARY OF INVENTION

An object of the present invention is to provide a communication quality monitoring system for specifying a quality degradation point with suppressing a monitoring cost of a network.

According to a present invention, in a network formed by packet transfer apparatuses and whose packet transfer route can be controlled by an external controller, a communication quality monitoring system consists of a normal monitoring route planning unit, which determines a normal monitoring routes for sensing a degradation of communication quality occurred in a quality monitoring area of the network (called a communication quality degradation monitoring routes); a quality degrading point monitoring route planning unit, which determines area locating monitoring routes that specify point degraded communication quality and narrows network area that existed the communication quality degrading point when a quality degradation occurs in the network (called communication quality degrading area locating monitoring routes); a forwarding rule configuring unit, which sets normal monitoring routes and area locating monitoring routes as packet forwarding routes; a communication quality measuring unit which measures communication qualities by sensing communication conditions of communication quality degradation monitoring routes and communication quality degrading area locating monitoring routes; and a communication quality degrading point inferring unit, which infers an occurrence of a quality degradation and an area of the occurrence of the quality degradation based on a result of the measuring of the communication quality.

According to a present invention, a network monitoring method, performed by a computer, includes: determining a normal monitoring route for sensing an event of a quality degradation occurred in a quality monitoring area of a network formed by packet forwarding apparatuses and whose packet forwarding routes can be controlled by an external controller; determining area locating monitoring routes for narrowing an existing area of the communication quality degrading point from the normal monitoring route and for specifying a communication quality degradation point when a quality degradation occurs in the network; setting normal monitoring routes and area locating monitoring routes as packet forwarding routes; measuring a communication quality by sensing communication conditions of communication quality degradation monitoring routes and communication quality degrading area locating monitoring routes; and inferring an occurrence of a quality degradation and an area of the occurrence of the quality degradation based on a result of the measuring of the communication quality.

A program according to a present invention is a program for making a computer executes processing of the above network monitoring method. Further, the program according to the present invention can be stored in a storage device, a storage medium, and the like.

According to the above, in a network in which a network frame formed by packet transfer apparatuses whose packet transfer route can be controlled by an external controller is mounted, the monitoring area can be dynamically changed.

BRIEF DESCRIPTION OF DRAWINGS

FIG. 4B is a view showing a specific example 2 of the operation in the first exemplary embodiment of the present invention;

FIG. 4C is a view showing a specific example 3 of the operation in the first exemplary embodiment of the present invention;

FIG. 4D is a view showing a specific example 4 of the operation in the first exemplary embodiment of the present invention;

FIG. 4E is a view showing a specific example 5 of the operation in the first exemplary embodiment of the present invention;

FIG. 5 is a flowchart showing an operation for coping with a network topology change in the first exemplary embodiment of the present invention;

FIG. 7B is a flowchart showing an operation in the second exemplary embodiment of the present invention;

FIG. 9B is a flowchart showing an operation in the third exemplary embodiment of the present invention;

FIG. 10B is a view showing a specific example 2 of the operation in the third exemplary embodiment of the present invention;

FIG. 10C is a view showing a specific example 3 of the operation in the third exemplary embodiment of the present invention;

DESCRIPTION OF EXEMPLARY EMBODIMENTS

<First Exemplary Embodiment>

A first exemplary embodiment of the present invention will be described below in detail with reference to the accompanying drawings.

Figure 1:
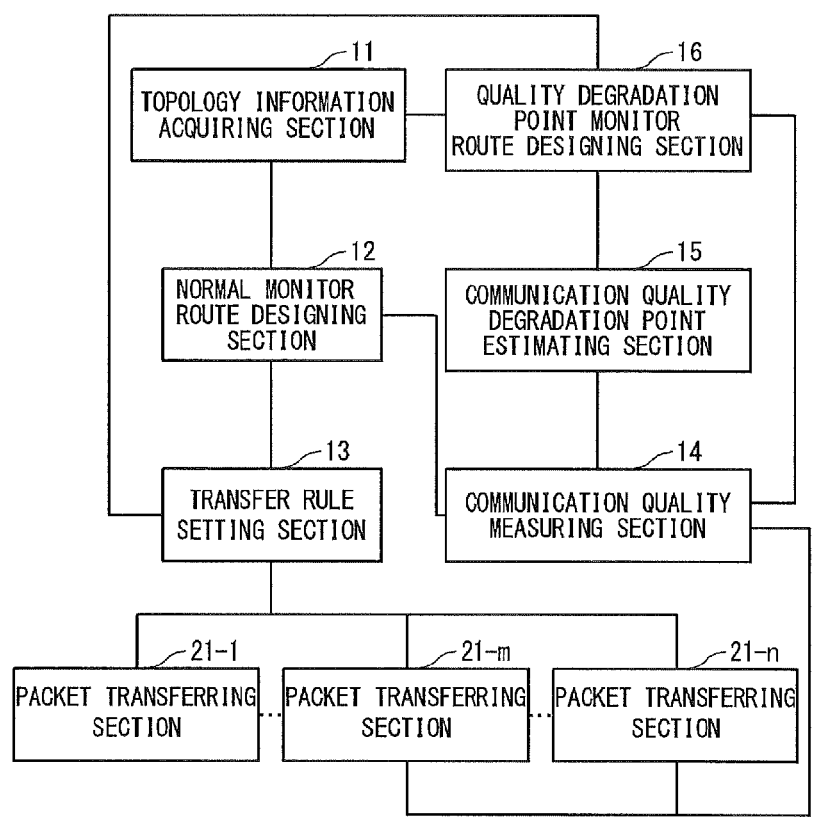
FIG. 1 is a block diagram showing a configuration in a first exemplary embodiment of the present invention.

With reference to FIG. 1, a communication quality monitoring system in the first exemplary embodiment of the present invention includes a topology information acquiring units 11, a normal monitoring route planning unit 12, a forwarding rule configuring unit 13, a communication quality measuring unit 14, a communication quality degrading point inferring unit 15 and a quality degrading point monitoring route planning unit 16.

Further, N packet forwarding units 21-$i$ (i=1 to n: n is an arbitrary number) are connected to the forwarding rule configuring unit 13 and the communication quality measuring unit 14. Each of the packet forwarding units 21-$i$ (i=1 to n) is an apparatus for communicating and transferring the actual packets.

[Details of Configuration]

Those units are operated as follows, respectively.

The topology information acquiring units 11 acquires topology information. The topology information is the information that indicates a configuration in which each of terminals and control apparatus in a computer network are connected.

When a network management system holds the topology information, the topology information acquiring units 11 can acquire the topology information by making an inquiry to the network management system. The network management system indicates the collective name of hardware and software to manage the network.

Also, the topology information acquiring units 11 can also prepare the topology information, on the basis of response messages from respective apparatuses and the like, by using an individual topology discovery protocol or an information provision protocol for discovering a topology and the like.

Further, the topology information acquiring units 11 may have a function for holding the topology information as a cache or the like in order to enhance information efficiency. The cache indicates a data, which is high in use frequency and duplicated in a high-speed storage device.

The topology information acquiring units 11 can acquire the topology information at a predetermined timing. For example, the topology information acquiring units 11 acquires the topology information when the monitoring system starts. Or, the topology information acquiring units 11 acquires the topology information when the topology information is changed. For realizing this, the topology information acquiring units 11 uses a means for calling back the notification of the topology information change, by asking the network management system about the topology information. Or, the topology information acquiring units 11 periodically acquires the topology information.

When the topology information is changed, the topology information acquiring units 11 notifies the change of the topology information to the normal monitoring route planning unit 12.

When the topology information acquiring units 11 receives an inquiry about the topology information from the quality degrading point monitoring route planning unit 16, the topology information acquiring units 11 acquires the topology information, and notifies the topology information to the quality degrading point monitoring route planning unit 16 as a response.

When the change in the topology information is notified by the topology information acquiring units 11, the normal monitoring route planning unit 12 acquires the topology information from the topology information acquiring units 11 and calculates a communication route of a monitoring flow to detect a communication quality degradation on a route of a network being a monitoring target.

This calculation method (calculation equation) of the communication route of the monitoring flow is referred to as "a communication quality degradation normal monitoring route calculation algorithm".

"The communication quality degradation normal monitoring route calculation algorithm" will be described later.

Further, the communication route determined by the calculation based on the communication quality degradation normal monitoring route calculation algorithm is referred to as "the communication quality degradation normal monitoring route" (a normal monitoring route).

That is, "the communication quality degradation normal monitoring route" is the communication route of the monitoring flow to sense an event when the quality degradation occurs in a quality monitoring area of the network.

The normal monitoring route planning unit 12 determines the communication quality degradation normal monitoring route by the calculation based on the communication quality degradation normal monitoring route calculation algorithm.

The normal monitoring route planning unit 12 notifies the determined communication quality degradation normal monitoring route to the forwarding rule configuring unit 13 and instructs the forwarding rule configuring unit 13 to set the route. That is, the normal monitoring route planning unit 12 requires the forwarding rule configuring unit 13 to set the communication quality degradation normal monitoring route.

Further, the normal monitoring route planning unit 12 notifies the determined communication quality degradation normal monitoring route to the communication quality measuring unit 14 and instructs the communication quality measuring unit 14 to start the quality measurement. That is, the normal monitoring route planning unit 12 requires the communication quality measuring unit 14 to start the quality measurement of the communication quality degradation normal monitoring route.

When the communication quality degradation normal monitoring route is notified by the normal monitoring route planning unit 12, the forwarding rule configuring unit 13 generates the forwarding rules to each of the packet forwarding units $21\text{-}i$ (i=1 to n) and sets the forwarding rules for each of the packet forwarding units $21\text{-}i$ (±1 to n). Consequently, each of the packet forwarding units $21\text{-}i$ (i=1 to n) can carry out the communication through the communication quality degradation normal monitoring route. Since the forwarding rule configuring unit 13 usually controls the communication for services such as an online-service and the like, the forwarding rule configuring unit 13 may be installed on the network management system.

The communication quality measuring unit 14 transmits the monitoring flow for monitoring: the communication quality degradation normal monitoring route that is determined by the normal monitoring route planning unit 12; and a communication quality degradation area locating monitoring route that is determined by the quality degrading point monitoring route planning unit 16, to the corresponding packet forwarding units $21\text{-}i$ (i=m to n, 1≤m≤n) to measure the communication quality of the monitoring flow. Then, the communication quality measuring unit 14 notifies the measurement result to the communication quality degrading point inferring unit 15.

The communication quality degradation area locating monitoring route is described together with the quality degrading point monitoring route planning unit 16.

Further, the measurement of the communication quality can be achieved based on the loss rate of the packets, the statistical values (the average, the minimum, the maximum and the like) of delay times, a band width and the like. Also, the measurement timing can be mounted with various manners such as a continuous measurement and a periodical measurement.

The communication quality measuring unit 14 can be attained by using a traffic measurement function, which is installed in many apparatuses, such as the packet forwarding units $21\text{-}i$ (i=1 to n).

Note that, the communication quality measuring unit 14 can be attained if the communication quality measuring unit 14 is installed on at least one probe terminal. Thus, in this exemplary embodiment and the following explanation, it is assumed that the communication quality measuring unit 14 is installed on one apparatus for simplifying the description.

In a case where the communication quality measuring unit 14 is installed in a plurality of apparatuses, only the following points are different: in each route calculation algorithm, the route is determined by taking the fact that they are installed in a plurality of apparatuses into consideration; and the number of targets whose information are collected by the communication quality degrading point inferring unit 15 becomes plural.

When a design is performed by taking the following three points into consideration, it is preferable to install them in a plurality of apparatuses.

1. A case in which one probe terminal is short of a monitoring process quantity.
2. A case in which, when a packet forwarding unit is troubled at a particular probe terminal or at the vicinity thereof, and a quality degradation inference is desired to be performed on a network of the far side from that apparatus.
3. A case in which a network load caused by the monitoring flow is desired to be smoothed in the entire network.

The communication quality degrading point inferring unit 15 infers the quality degradation point on the basis of the communication quality notified by the communication quality measuring unit 14. When the quality degradation point is inferred, an alarm (warning) message that indicates the occurrence of the quality degradation is notified to the corresponding network management system and a log collecting system.

Further, when the quality degradation point is inferred, the communication quality degrading point inferring unit 15 notifies the inference result to the quality degrading point monitoring route planning unit 16.

As an example of the method of inferring the quality degradation point, a method of inferring the degradation point that includes many quality degradation flows can be referred to. As another example, a method of defining as a set covering problem and inferring the communication quality degradation point by using those solutions can also be referred to.

That is, a combination of the least portions that satisfy the quality degradation monitoring flow is determined, and the determined combination of the portions can be inferred as the quality degradation point.

The communication quality degrading point inferring unit 15 notifies at least the quality degradation point, as the inference result to be notified to the quality degrading point monitoring route planning unit 16. Further, the communication quality degrading point inferring unit 15 can correlate the quality degradation flow that becomes a factor of the quality degradation inference, as auxiliary information, to the quality degradation point and notify to the quality degrading point monitoring route planning unit 16.

When the inference result is notified by the communication quality degrading point inferring unit 15, the quality degrading point monitoring route planning unit 16 acquires the topology information from the topology information acquiring units 11.

Then, the quality degrading point monitoring route planning unit 16 determines whether or not a detailed analysis is further required and whether or not the detailed analysis can be carried out by an addition of the monitoring flow from the inference result and the topology information. If the detailed analysis is required, the communication route of the monitoring flow to specify the quality degradation point in more detail is calculated.

This calculation method of the communication route of the monitoring flow is referred to as "a communication quality degradation area locating monitoring route calculation algorithm".

The communication quality degradation area locating monitoring route calculation algorithm will be described later.

Further, route information determined by the calculation based on the communication quality degradation area locating monitoring route calculation algorithm is referred to as "a communication quality degradation area locating monitoring route" (area locating monitoring routes).

That is, "the communication quality degradation area locating monitoring route" is the communication route of the monitoring flow for specifying the communication quality degradation point by narrowing down the possible area of the communication quality degradation point compared with the communication quality degradation normal monitoring route, in the case that the detailed analysis is required about the communication quality degradation.

The quality degrading point monitoring route planning unit 16 notifies the determined communication quality degradation area locating monitoring route to the forwarding rule configuring unit 13 and instructs the forwarding rule configuring unit 13 to set the route. That is, the quality degrading point monitoring route planning unit 16 requires the forwarding rule configuring unit 13 to set the determined communication quality degradation area locating monitoring route.

The quality degrading point monitoring route planning unit 16 notifies the communication quality degradation area locating monitoring route to the communication quality measuring unit 14 and instructs the communication quality measuring unit 14 to start the quality measurement. That is, the quality degrading point monitoring route planning unit 16 requires the communication quality measuring unit 14 to start the quality measurement of the communication quality degradation area locating monitoring route.

Each of the packet forwarding units 21-$i$ (i=1 to n) transfers the communication packet in accordance with the forwarding rules. At this time, each of the packet forwarding units 21-$i$ (i=1 to n) has a function which, when there is not the forwarding rules, inquires an external server (an external route determination server) and requests the external server to determine the forwarding rules (requires the determination of the forwarding rules). As an example of the external route determination server, an external controller such as the OpenFlow Controller and the like is considered.

[Example of Hardware Configuration]

Here, as an example of the communication quality monitoring system of the present invention, a computer such as PC (Personal Computer), a thin client server, a workstation, a mainframe, a supercomputer and the like is assumed. Further, this system is not limited to the terminal or server. A relay apparatus or a peripheral apparatus may be used. Also, this system may be an expansion board installed in the computer or a virtual machine (VM) established on a physical machine.

Further, the topology information acquiring units 11, the normal monitoring route planning unit 12, the forwarding rule configuring unit 13, the communication quality measuring unit 14, the communication quality degrading point inferring unit 15 and the quality degrading point monitoring route planning unit 16 may be those that are attained by using a processor which is driven and executing a predetermined process in accordance with a program, a memory for storing the program and various data, and an interface used to communicate with networks.

As an example of the above processor, a CPU (Central Processing Unit), a network processor (NP), a microprocessor, a microcontroller, or a semiconductor integrated circuit (IC) or the like is considered.

As an example of the above memory, a semiconductor storage device such as RAM (Random Access Memory), ROM (Read Only Memory), EEPROM (Electrically Erasable and Programmable Read Only Memory), a flash memory or the like, an auxiliary storage device such as HDD (Hard Disk Drive), SSD (Solid State Drive), or the like, or a removable disk such as DVD (Digital Versatile Disk) or the like, or a storage media such as an SD memory card (Secure Digital memory card), or the like is considered. Also, a buffer or a register may be used. Also, a storage device, which uses DAS (Direct Attached Storage), FC-SAN (Fibre Channel—Storage Area Network), NAS (Network Attached Storage), IP-SAN (IP—Storage Area Network) or the like, may be used.

Further, the above processor and the above memory may be integrated into a single unit. For example, in recent years, the structure of one chip microcomputer or the like has been progressed. Thus, a case of the present system is considered in which one chip microcomputer installed in this system has a processor and a memory.

As an example of the above interface, a board (a mother board or an I/O board) corresponding to a network communication, a semiconductor integrated circuit such as a chip or the like, a network adaptor such as NIC (Network Interface Card) or the like or the similar expansion card, a communication apparatus such as an antenna or the like, a communication port such as a connection port (connector) or the like, or the like is considered.

Further, as an example of the network, the Internet, LAN (Local Area Network), a wireless LAN, WAN (Wide Area Network), a backbone, a cable television (CATV) line, a land-phone network, a mobile telephone network, WiMAX (IEEE 802.16a), 3G (Third Generation), a lease line, IrDA (Infrared Data Association), Bluetooth (Registered Trademark), a serial communication line, a data bus or the like is considered.

Further, the topology information acquiring units 11, the normal monitoring route planning unit 12, the forwarding rule configuring unit 13, the communication quality measuring unit 14, the communication quality degrading point inferring unit 15 and the quality degrading point monitoring route planning unit 16 may be a module, a component, or a dedicated device, or a starting (calling) program thereof.

As an example of the packet forwarding units 21-$i$ (i=1 to n), the semiconductor integrated circuit such as the board (the mother board or the I/O board) corresponding to the network communication, the network adaptor such as NIC (Network Interface Card) or the like or the similar expansion card, the communication apparatus such as the antenna or the like, the communication port such as the connection port (connector) or the like, or the like is considered Further, in a case where the packet forwarding units 21-$i$ (i=1 to n) are external apparatuses, as an example of the packet forwarding unit 21-$i$ (i=1 to n), a network switch such as the L3 switch (the layer 3 switch), the L4 switch (the layer 4 switch), the L7 switch/application switch (the layer 7 switch), a multilayer switch and the like, a router, a proxy, a gateway, a firewall, a load balancer (a load dispersion apparatus), a band control apparatus/security monitor control apparatus (gatekeeper), a base station, an access point (AP), a communication satellite (CS), or a computer having a plurality of communication ports or the like is considered.

Moreover, each of the packet forwarding units 21-$i$ (i=1 to n) may be a virtual switch, a virtual machine monitor (VMM) such as a hypervisor and the like.

However, actually, they are not limited to those examples.

[Explanation of Algorithm]

The communication quality degradation normal monitoring route calculation algorithm and the communication quality degradation area locating monitoring route calculation algorithm will be described below.

Although those algorithms are basically independent, they have the following relations.

The communication quality degradation area locating monitoring route calculation algorithm is an algorithm for designing the communication route of the monitoring flow which can carry out the analysis in more detail as compared with the communication quality degradation normal monitoring route calculation algorithm.

As those algorithms, various means can be considered. The examples of those algorithms will be described below. However, actually, they are not limited to the following examples. The important points are in that they satisfy the respective objects of the algorithms, and they satisfy the above relation between the algorithms, namely, the difference between the resolutions of search areas.

[Communication Quality Degradation Normal Monitoring route Calculation Algorithm]

The communication quality degradation normal monitoring route calculation algorithm is an algorithm for designing a communication route of a monitoring flow, which can determine that the communication quality degradation occurs in a route on the network subjected to the measurement (targeted for monitoring).

As a working example of the communication quality degradation normal monitoring route calculation algorithm, a method of using an algorithm for determining a tree configuration can be referred to.

For example, the normal monitoring route planning unit 12 generates a tree route that can be reached by the shortest hops (the minimum number of the hops) from the probe terminal, and makes a link, which does not belong to the tree, belong to an arbitrary route. Here, the link is a line which links a node and a node. The node indicates an individual element configuring the network. A branch derived from the route of this tree is counted as one component, and the route pursued to search for the left depth is defined as the communication route of the monitoring flow. Consequently, it is possible to design the communication route of the monitoring flow, which can determine that a communication quality degradation occurs in the route on the network.

Further, as another example of the communication quality degradation normal monitoring route calculation algorithm, it is possible to use an algorithm for determining a link set being connectable with a one stroke.

For example, the normal monitoring route planning unit 12 determines the maximum link set which is connectable with a one stroke. By the condition of being connectable with a one stroke, it is meant that, in a set of nodes and links, all of the links going out from the nodes are even-numbered, or only the two nodes of a start point and an end point have the odd-numbered links and the other nodes have even-numbered links. Or, when the network representation is represented as a directed graph, with regard to the even-numbered links, the number of input direction links and the number of output direction links are equal to each other in each node, and with regard to the odd-number holding nodes, the number of the input direction links is one more than the number of the output direction links in one of the nodes, and the number of the output direction links is one more than the number of the input direction links in the other nodes.

Concretely explaining, when the link set is connected with a one stroke, once it enters an intermediate node, it must always go out from the node. For this reason, since the link for the intermediate node requires both of incoming link and outgoing link in a case of a non-directed graph, the number of the links is required to be two times the number of the incoming links. Thus, the number of the links of the intermediate node becomes even-numbered.

As for the nodes of the start point and the end point, in a case that the start point and the end point are the same nodes, if the links whose number is equal to the number of the outgoing links do not return, they cannot arrive at the same node. For this reason, the links for the node in which the start point and the end point are the same require both of the incoming link and the outgoing link in the case of the non-directed graph. Thus, the number of the links is required to be two times the number of the incoming links. Hence, in the case of the node in which the start point and the end point are the same, the number of the links of each of the start point node and the end point node becomes even-numbered.

On the contrary, in a case of the node in which the start point and the end point are different, the link only goes out from the start point node. Thus, only one link is required as the outgoing link. Even if the link returns to the start point node, the link may go out again. Thus, as a result, the number of the outgoing links is one more than the number of the incoming links. For this reason, the links for the node in which the start point and the end point are different may be determined such that the number of the outgoing links is one more than the number of the incoming links, in the case of the non-directed graph. At the end point node, the link may only come in, on the contrary of the start point node. Thus, only one link is required as the incoming link. Hence, in the case of the node in which the start point and the endpoint are different, the number of the links in each of the start point node and the end point node becomes odd-numbered.

The normal monitoring route planning unit 12 selects the node located close to the probe terminal, from the nodes that can serve as the start point or the end point, on the basis of this set being connectable with a one stroke.

The normal monitoring route planning unit 12 determines the route connectable with a one stroke from the start point and end point nodes and simultaneously determines the shortest path to the start point and the end point and defines the path, which are the addition of the shortest path and the route connectable with a one stroke, as the communication route of the monitoring flow.

The normal monitoring route planning unit 12 determines the maximum link set, which is similarly connectable with a one stroke, in the network from which the link set being connectable with a one stroke is removed, to determine the communication route of the second monitoring flow.

Those processes are repeated until the link set is removed. Consequently, it is possible to design the communication route of the monitoring flow, which can determine that the communication quality degradation occurs in the route on the network.

Further, in each communication quality degradation normal monitoring route calculation algorithm which is exemplified above, the limitation can be applied by determining the maximum hop number in the monitoring flow, and in the case where the maximum hop number is exceeded, by dividing the branch or determining a small set.

[Communication Quality Degradation Area locating Monitoring route Calculation Algorithm]

The communication quality degradation area locating monitoring route calculation algorithm is the algorithm for designing the communication route of the monitoring flow, which can carry out the analysis in more detail, as compared with the communication quality degradation normal monitoring route calculation algorithm, as explained above.

Further, this communication quality degradation area locating monitoring route calculation algorithm does not necessarily able to perform a detailed analysis at a time. It may perform the analysis in a step-by-step manner.

A working example of the communication quality degradation area locating monitoring route calculation algorithm will be described below.

As the working example of the communication quality degradation area locating monitoring route calculation algorithm, a method of deleting apart of the links in the monitoring flow which causes the quality degradation can be referred to.

For example, in the case of a route determined in the tree structure, the quality degrading point monitoring route planning unit 16 gradually deletes the portion serving as a leaf of the route (the deletion with-time/step-by-step deletion). Further, as another example, in the case of the determination based on the one stroke connection, the quality degrading point monitoring route planning unit 16 determines a smaller set connectable with a one stroke and the link route other than it.

Further, as another example of the communication quality degradation area locating monitoring route calculation algorithm, a method of using a partial route, which is a route obtained by dividing the monitoring flow that causes the quality degradation, as a basis can be referred to.

For example, the quality degrading point monitoring route planning unit 16 designs new monitoring flows as follows. The route of the monitoring flow which causes the quality degradation is divided into N routes. A route from each divided route to the probe terminal connected node which does not pass through the link of the other divided set as much as possible is determined as the new monitoring flow.

[Basic Operation of First Exemplary Embodiment]

Figure 2A:
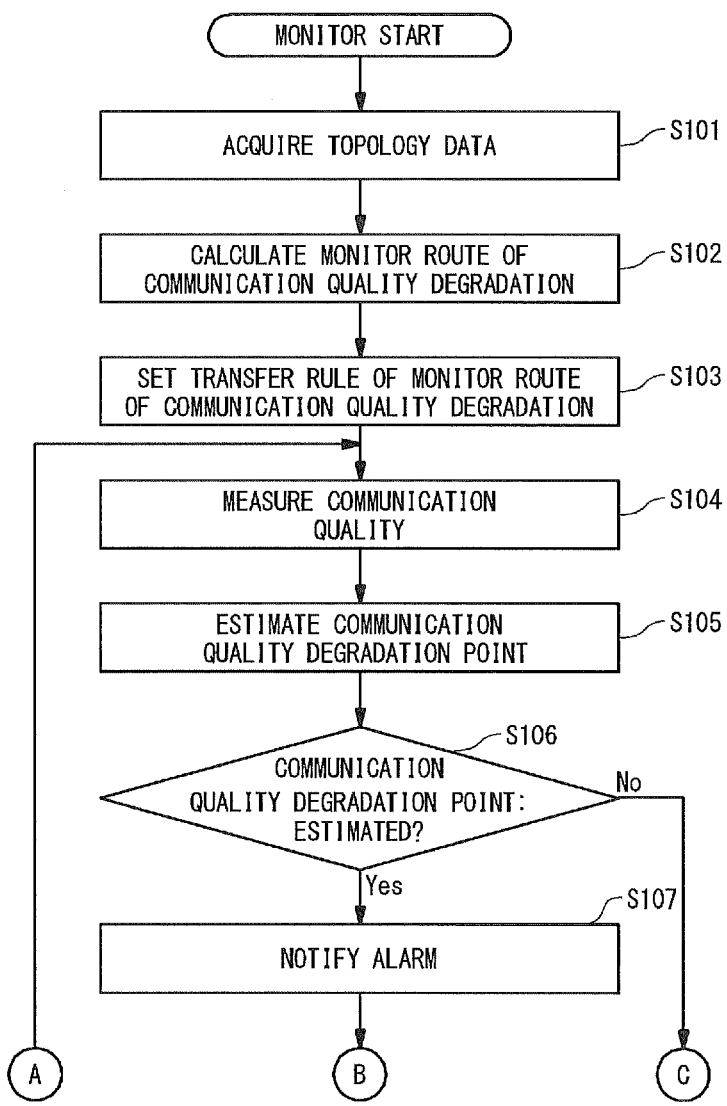
FIG. 2A is a flowchart showing an operation in the first exemplary embodiment of the present invention.
Figure 2B:
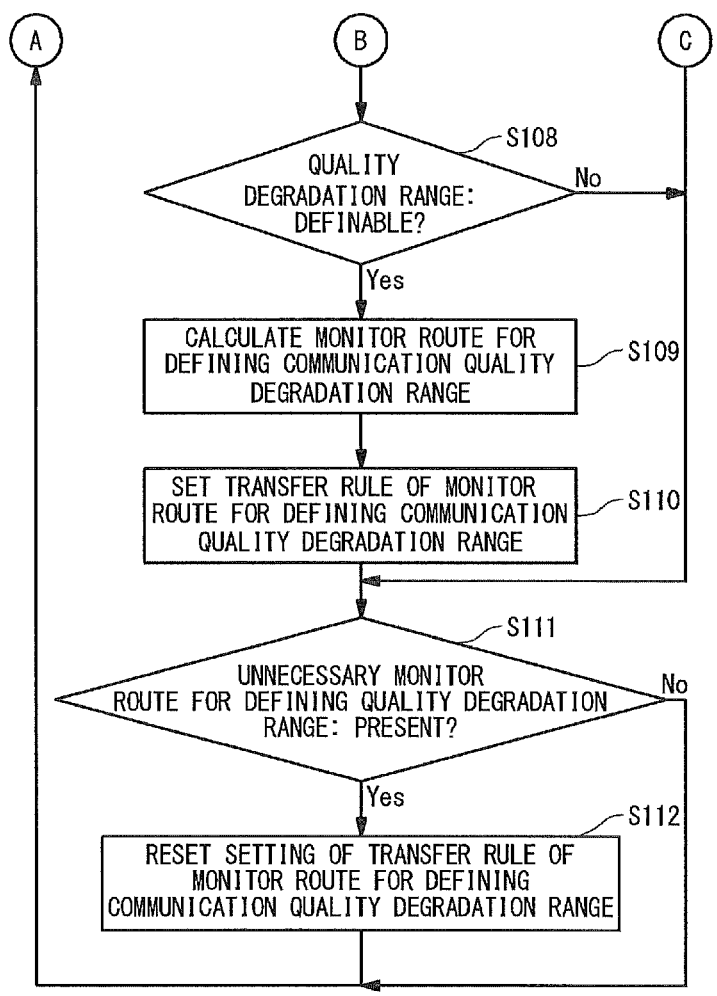
FIG. 2B is a flowchart showing an operation in the first exemplary embodiment of the present invention.

A basic operation in this exemplary embodiment will be described below in detail, with reference to the flowcharts FIGS. 2A and 2B and the specific examples FIG. 3 and FIGS. 4A to 4E.

(1) Step S101

At first, when the monitoring is started, the topology information acquiring units 11 acquires a network topology, in accordance with an inquiry to the network management system or a monitoring based on a network topology discovery protocol. The topology information acquiring units 11 notifies the acquired topology information to the normal monitoring route planning unit 12.

(2) Step S102

The normal monitoring route planning unit 12, when the topology information is notified, determines the communication quality degradation normal monitoring route, on the basis of the communication quality degradation normal monitoring route calculation algorithm.

Figure 3:
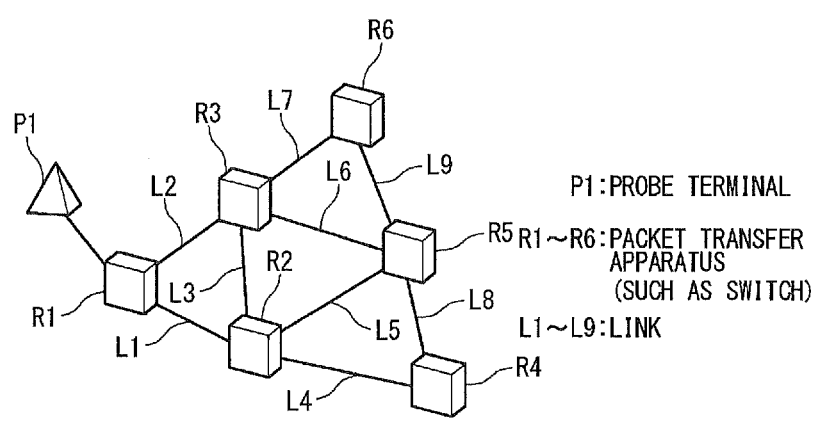
FIG. 3 is a view showing a specific example of an operation in each exemplary embodiment of the present invention.

The communication quality degradation normal monitoring route calculation algorithm is described by using the network shown in FIG. 3 as an example.

The network shown in FIG. 3 includes a probe terminal P1 and packet transfer apparatuses R1 to R6 such as switches and the like. The probe terminal P1 is connected to the packet transfer apparatus R1. The packet transfer apparatus R1 is connected through a link L1 to the packet transfer apparatus R2 and connected through a link L2 to the packet transfer apparatus R3. The packet transfer apparatus R2 is connected through a link L3 to the packet transfer apparatus R3 and connected through a link L4 to the packet transfer apparatus R4 and then connected through a link L5 to the packet transfer apparatus R5. The packet transfer apparatus R3 is connected through a link L6 to the packet transfer apparatus R5 and connected through a link L7 to the packet transfer apparatus R6. The packet transfer apparatus R4 is connected through a link L8 to the packet transfer apparatus R5. The packet transfer apparatus R5 is connected through a link L9 to the packet transfer apparatus R6.

For example, in the network shown in FIG. 3, on the basis of the one stroke connection, when the algorithm having the limit value of 6 hops is used to determine the communication quality degradation normal monitoring route, it is determined as a link set {L1, L2, L3, L4, L5, L8} and a link set {L2, L6, L7, L9}. The route is calculated based on those link sets.

Figure 4A:
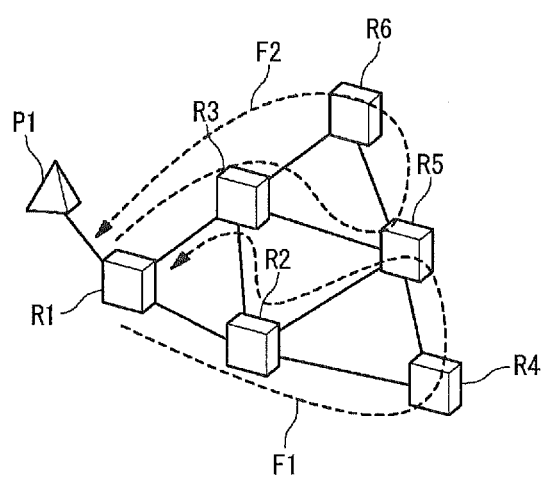
FIG. 4A is a view showing a specific example 1 of the operation in the first exemplary embodiment of the present invention.

Since the latter does not arrive at the probe terminal, the shortest route to the node is determined. FIG. 4A is a view for explaining the calculation and setting of the communication quality degradation normal monitoring route. Here, as shown in FIG. 4A, two of the monitoring flow F1 (=L1→L4→L8→L5→L3→L2) whose route is the link set {L1, L2, L3, L4, L5, L8} and the monitoring flow F2 (=L2→L6→L9→L7→L2) whose route is the link set {L2, L6, L7, L9} are determined.

(3) Step S103

The normal monitoring route planning unit 12 notifies the communication quality degradation normal monitoring route, which is determined by the calculation, to the forwarding rule configuring unit 13, and sets the forwarding rules for each of the packet forwarding units 21-$i$ (i=1 ton). That is, the forwarding rule configuring unit 13 notifies the forwarding rules, which is notified by the normal monitoring route planning unit 12, to each of the packet forwarding units 21-$i$ (i=1 to n). Each of the packet forwarding units 21-$i$ (i=1 to n) sets the forwarding rules notified by the forwarding rule configuring unit 13.

(4) Step S104

The normal monitoring route planning unit 12, after setting the forwarding rules, notifies communication quality degradation normal monitoring route information to the communication quality measuring unit 14 and instructs starting of the communication of the monitoring flow for the communication quality degradation normal monitoring route. The communication quality measuring unit 14 transmits the monitoring flow for monitoring the communication quality degradation normal monitoring route to the corresponding packet forwarding units 21-$i$ (i=m to n and 1≤m≤n), and measures the communication quality of the monitoring flow and then notifies a communication quality result, as a measurement result, to the communication quality degrading point inferring unit 15.

(5) Step S105

The communication quality degrading point inferring unit 15 infers the quality degradation point from the communication quality result of the monitoring flow. FIG. 4B is a view for explaining the occurrence of the communication quality degradation and the inference of the communication quality degradation point. For example, in the network shown in FIG. 3, when a quality degradation occurs in the link L8 as shown in FIG. 4B, the quality degradation occurred in the monitoring flow F1 is notified. Further, a fact that any problem does not exist in the monitoring flow F2 is notified. Consequently, a fact that the communication quality degradation occurs in any of the L1, L3, L4, L5 and L8 links is inferred.

(6) Step S106

The communication quality degrading point inferring unit 15 verifies whether or not the quality degradation point is inferred.

(7) Step S107

When the quality degradation point is inferred, the communication quality degrading point inferring unit 15 notifies the alarm (warning) to the network management system and the like. At this time, when the quality degradation points are continuously inferred or when they are inferred in the same area within a certain period, the alarm (warning) notification can be omitted.

(8) Step S108

The communication quality degrading point inferring unit 15 notifies the inference result of the quality degradation point to the quality degrading point monitoring route planning unit 16. The quality degrading point monitoring route planning unit 16 acquires the topology information from the topology information acquiring units 11 and determines whether or not the inferred quality degradation point can be further defined in the area, on the basis of the communication quality degradation area locating monitoring route calculation algorithm.

(9) Step S109

If further defining is possible, the communication quality degrading point inferring unit 15 determines the communication quality degradation area locating monitoring route, on the basis of the communication quality degradation area locating monitoring route calculation algorithm.

(10) Step S110

After that, the communication quality degrading point inferring unit 15 sets the forwarding rules for the monitoring flow with regard to the communication quality degradation area locating monitoring route, for each of the packet forwarding units 21-$i$ (i=1 to n), through the forwarding rule configuring unit 13.

For example, in the network shown in FIG. 3, the quality degradation occurs in the monitoring flow F1, and the link set {L1, L3, L4, L5, L8} is determined to cause the quality degradation. From them, the monitoring route of a monitoring flow F3 (=L1→L4→L8→L5→L1) whose route is the link set {L1, L4, L5, L8} is found out as the route of the smaller one stroke connectable set.

Further, FIG. 4C is a view for explaining the calculation and additional setting of the communication quality degradation area locating monitoring route and the inference of the communication quality degradation point. As shown in FIG. 4C, a monitoring flow F4 (=L1→L3→L2) whose route is the link set {L1, L2 L3} can be generated for the remaining link set {L3}. That is, a more detailed area can be specified. Thus, this monitoring route is defined as the communication quality degradation area locating monitoring route, and this communication quality degradation area locating monitoring route is set as the communication route of the monitoring flow.

(11) Step S111

The quality degrading point monitoring route planning unit 16 verifies the presence or absence of an unnecessary communication quality degradation area locating monitoring route.

At this time, the quality degrading point monitoring route planning unit 16 notifies the determined communication quality degradation area locating monitoring route to the communication quality measuring unit 14 and instructs the communication quality measuring unit 14 to start the communication of the monitoring flow with regard to the communication quality degradation area locating monitoring route and instructs the communication quality measuring unit 14 to measure the quality degradation (the operational flow proceeds to the step S104).

(12) Step S112

When the quality degradation point is solved, the communication quality degradation area locating monitoring route is not required to be monitored. Thus, the quality degrading point monitoring route planning unit 16 determines it as the unnecessary communication quality degradation area locating monitoring route and resets the monitoring flow setting for the communication quality degradation area locating monitoring route.

That is, when the foregoing communication quality degradation area locating monitoring route is sensed from a communication quality result notification, through the forwarding rule configuring unit 13, each of the packet forwarding units 21-$i$ (i=1 to n) is instructed to reset the setting of the forwarding rules for the monitoring flow with regard to the communication quality degradation area locating monitoring route, and simultaneously with the above reset, the communication quality measuring unit 14 is instructed to stop the communication of the corresponding monitoring flow.

The above-mentioned quality measurement and quality degradation area locating are repeated, thereby achieving an object of the present invention. For example, in the network shown in FIG. 3, the qualities of the monitoring flows F1 to F4 are measured, and the link set {L4, L5, L8} is inferred to cause the quality degradation.

Also, FIG. 4D is the view for explaining the calculation and additional setting (the second time) of the communication quality degradation area locating monitoring route and the inference of the communication quality degradation point. As shown in FIG. 4D, a monitoring flow F5 (=L1→L4→L8→L9→L7→L2) whose route is a link set {L1, L2, L4, L7, L8, L9} and a monitoring flow F6 (=L1→L5→L6→L2) whose route is a link set {L1, L2, L5, L6} can be determined as the monitoring flow that can further define the link set that causes the quality degradation. The qualities of the monitoring flows F5, F6 are measured, and the link set {L4, L8} is inferred to cause the quality degradation.

Further, FIG. 4E is a view for explaining the calculation and additional setting (the third time) of the communication quality degradation area locating monitoring route and the inference of the communication quality degradation point. As shown in FIG. 4E, a monitoring flow F7 (=L1→L4→L4→L1) whose route is a link set {L1, L4} and a monitoring flow F8 (=L1→L4→L8→L6→L2) whose route is a link set {L1, L2, L6, L8} can be determined as the monitoring flow that can further define the link set that causes the quality degradation. The qualities of the monitoring flows F7, F8 are measured, and finally, it is possible to detect that the quality degradation is occurred in the link L8.

(Operation when Network Topology is Changed)

The operation at the time of the network topology change in this exemplary embodiment will be described below in detail with reference to the flowchart in FIG. 5. For example, when a topology management unit or the topology information acquiring units 11 in the network management system senses a change in the topology, the operation shown in this flowchart is started. The operation shown in this flowchart is assumed to correspond to the operations between the step S101 to the step S104 in the flowcharts in FIGS. 2A and 2B.

(1) Step S201

At first, the topology information acquiring units 11 acquires the changed topology information (new topology information).

(2) Step S202

The topology information acquiring units 11 notifies the new topology information to the normal monitoring route planning unit 12. The normal monitoring route planning unit 12 resets the registrations of the monitoring flow which corresponds to the previous communication quality degradation normal monitoring route from the packet forwarding units 21-$i$ (i=1 to n) and the communication quality measuring unit 14, respectively, through the forwarding rule configuring unit 13.

(3) Step S203

The normal monitoring route planning unit 12 determines a new communication quality degradation normal monitoring route, by using the communication quality degradation normal monitoring route calculation algorithm, in accordance with the new topology information.

(4) Step S204

The normal monitoring route planning unit 110 notifies the communication quality degradation normal monitoring route, which is determined by the calculation, to the forwarding rule configuring unit 13 and sets the forwarding rules for the respective packet forwarding units 21-$i$ (i=1 to n).

(5) Step S205

The normal monitoring route planning unit 12, after setting the forwarding rules, notifies the new communication quality degradation normal monitoring route information and instructs the communication quality measuring unit 14 to start the communication of the monitoring route with regard to the new communication quality degradation normal monitoring route.

By the above operation, the communication quality degradation normal monitoring route is updated, and the monitor area corresponds to the topology change. Hereafter, the operations are linked to the operations on and after the step S105 of the flowchart in FIG. 2A, and the quality degradation monitoring process corresponding to the changed topology is carried out.

The effects of the first exemplary embodiment will be described below.

In the first exemplary embodiment, the monitoring flow is divided into: the communication quality degradation normal monitoring route for sensing the occurrence of a quality degradation in the network; and the communication quality degradation area locating monitoring route to gradually specify the portion of the occurred quality degradation, and the latter (the communication quality degradation area locating monitoring route) is added after the occurrence of the quality degradation is sensed. Consequently, it is possible to reduce the quantity of the monitoring packet that flows in the network.

Further, the first exemplary embodiment is further designed to be able to establish an algorithm for efficiently calculating the two monitoring routes, by using the network whose forwarding rules can be controlled from the external as the base. Consequently, when the quality degradation is sensed, the quality degradation can be measured by using a smaller number of monitoring flows, and when the quality degradation occurs, the monitoring flow can be dynamically added in order to specify the quality degradation point. Thus, the detailed inference can be carried out with the smaller number of the monitoring flows.

Further, the first exemplary embodiment is further designed such that the network whose forwarding rules can be controlled from the external is used as the base, and the particular quality degradation measuring unit can transmit and receive the monitoring flow. Thus, the entire network can be monitored and sensed by a smaller number of the probe terminals.

Further, in the first exemplary embodiment, from the viewpoint of the above-mentioned merits, the communication quality can be measured by using a smaller number of the probe terminals and a smaller number of the monitoring flows. Thus, the information quantity for the quality degradation point inference becomes small, and it is possible to reduce the various costs, such as the network cost for the information collection and the calculation cost for the inference of the quality degradation point, and the like.

<Second Exemplary Embodiment>

A second exemplary embodiment of the present invention will be described below.

Figure 6:
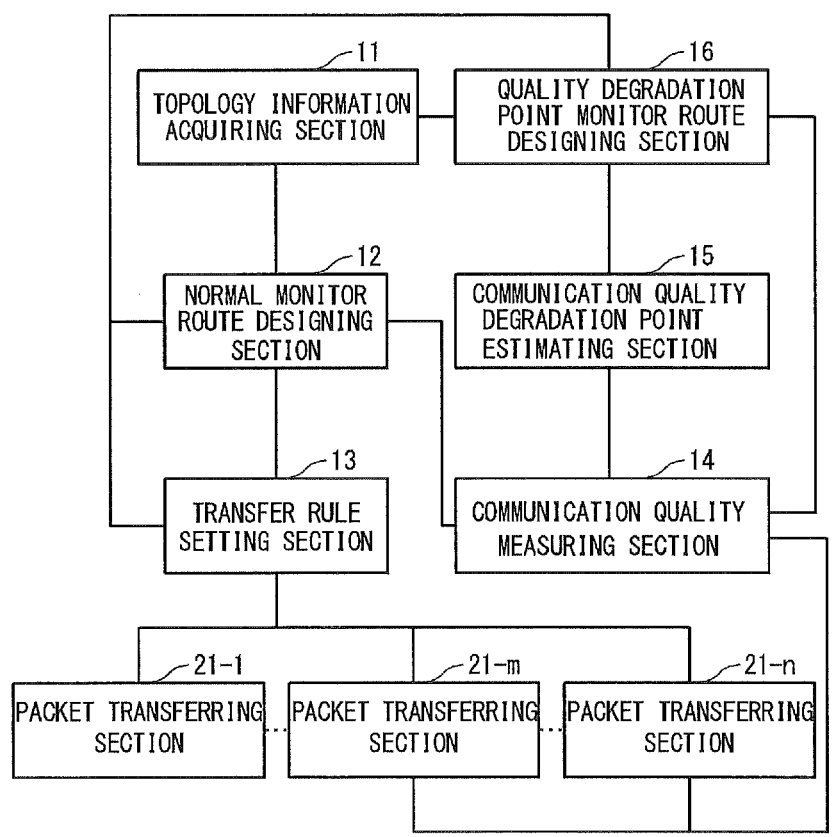
FIG. 6 is a block diagram showing a configuration in a second exemplary embodiment of the present invention.

FIG. 6 shows a communication quality monitoring system in the second exemplary embodiment of the present invention. Here, the portions modified from the first exemplary embodiment of the present invention are described.

With regard to this exemplary embodiment, a difference from the first exemplary embodiment of the present invention lies only in a configuration that the normal monitoring route planning unit 12 and the quality degrading point monitoring route planning unit 16 can be linked to each other as shown in FIG. 6.

In this exemplary embodiment, when a change in the topology information is notified by the topology information acquiring units 11, the normal monitoring route planning unit 12 acquires the topology information from the topology information acquiring units 11 and calculates the communication quality degradation normal monitoring route, in accordance with the communication quality degradation normal monitoring route calculation algorithm.

The normal monitoring route planning unit 12 notifies the determined communication quality degradation normal monitoring route to the forwarding rule configuring unit 13 and instructs the forwarding rule configuring unit 13 to set the route.

The normal monitoring route planning unit 12 notifies the communication quality degradation normal monitoring route, to the communication quality measuring unit 14 and instructs the communication quality measuring unit 14 to start the quality measurement.

Further, the normal monitoring route planning unit 12 holds the information of the monitoring start and monitoring stop of the determined communication quality degradation normal monitoring route, and manages the monitoring start and monitoring stop of the communication quality degradation normal monitoring route, in accordance with the notification from the quality degrading point monitoring route planning unit 16. When the monitoring of the communication quality degradation normal monitoring route is started or stopped, the normal monitoring route planning unit 12 notifies the monitoring start or monitoring stop of the targeted communication quality degradation normal monitoring route, to the communication quality measuring unit 14 and instructs the communication quality measuring unit 14 to start and stop the monitoring.

When the inference result from the communication quality degrading point inferring unit 15 is notified, the quality degrading point monitoring route planning unit 16 acquires the topology information from the topology information acquiring units 11. Then, the quality degrading point monitoring route planning unit 16 determines whether or not a detailed analysis can be carried out, from the inference result and the topology information.

If the detailed analysis is required, the quality degrading point monitoring route planning unit 16 calculates the communication quality degradation area locating monitoring route, in accordance with the communication quality degradation area locating monitoring route calculation algorithm. Further, at this time, the quality degrading point monitoring route planning unit 16 determines the communication quality degradation area locating monitoring route and the communication quality degradation normal monitoring route so that their monitoring results are included in the added communication quality degradation area locating monitoring route. This is determined from, for example, the existing routes included in the added route.

That is, the quality degrading point monitoring route planning unit 16 determines the already-existing communication quality degradation area locating monitoring route and the communication quality degradation normal monitoring route which are included in the new communication quality degradation area locating monitoring route as the redundant monitoring route. Here, among the already-existing communication quality degradation area locating monitoring routes and the communication quality degradation normal monitoring route, the monitoring route in which all of the routes overlap with the new communication quality degradation area locating monitoring route is determined as a redundant monitoring route.

The quality degrading point monitoring route planning unit 16 notifies the determined communication quality degradation area locating monitoring route to the forwarding rule configuring unit 13 and instructs the forwarding rule configuring unit 13 to set the route.

Further, the quality degrading point monitoring route planning unit 16 notifies, with regard to the communication quality degradation area locating monitoring route, which includes the monitored result, to the forwarding rule configuring unit 13 and instructs the forwarding rule configuring unit 13 to reset the route setting.

Moreover, the quality degrading point monitoring route planning unit 16 notifies, with regard to the communication quality degradation normal monitoring route, which includes the monitored result, to the normal monitoring route planning unit 12 and instructs the normal monitoring route planning unit to stop monitoring the communication quality degradation normal monitoring route.

The quality degrading point monitoring route planning unit 16 notifies the communication quality degradation area locating monitoring route to the communication quality measuring unit 14 and instructs the communication quality measuring unit 14 to start the quality measurement.

Further, the quality degrading point monitoring route planning unit 16 notifies the communication quality degradation area locating monitoring route, which includes the monitored result, to the communication quality measuring unit 14 and instructs the communication quality measuring unit 14 to remove the quality measurement.

[Basic Operation of Second Exemplary Embodiment]

Figure 7A:
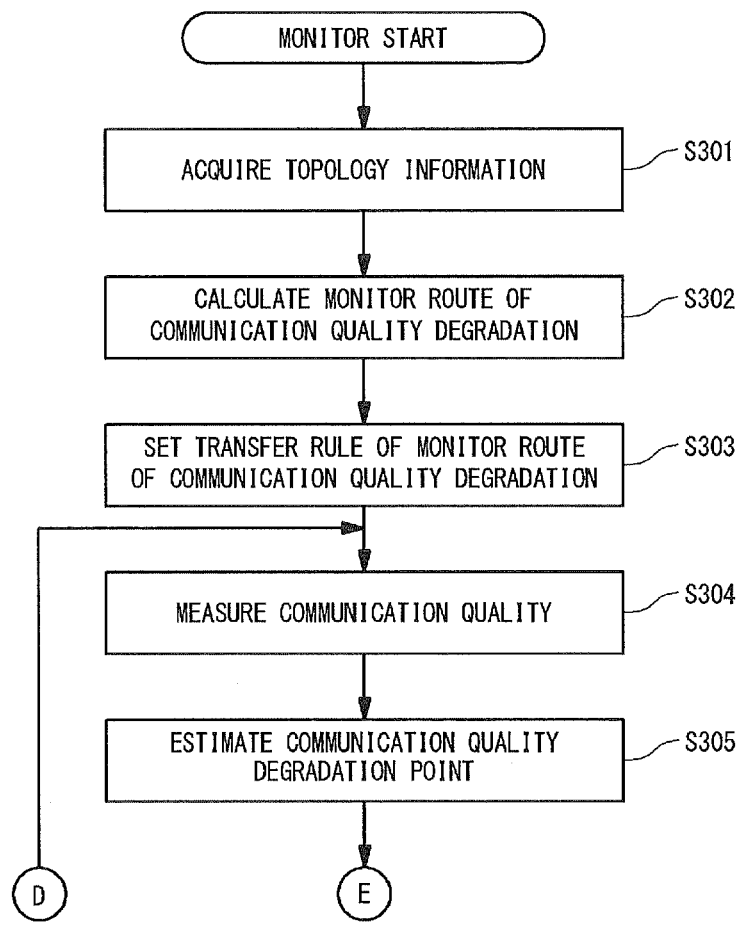
FIG. 7A is a flowchart showing an operation in the second exemplary embodiment of the present invention.

Next, the basic operations in the second exemplary embodiment will be described below in detail with reference to the flowcharts of FIGS. 7A and 7B. In order to describe the basic operations in more detail, the specific examples in FIG. 3 and FIGS. 4A to 4E are referred to.

(1) Step S301

At first, when the monitoring is started, the topology information acquiring units 11 acquires the network topology by an inquiry to the network management system or the monitoring based on the network topology discovery protocol. The topology information acquiring units 11 notifies the acquired topology information to the normal monitoring route planning unit 12.

(2) Step S302

When the topology information is notified, the normal monitoring route planning unit 12 determines the communication quality degradation normal monitoring route, on the basis of the communication quality degradation normal monitoring route calculation algorithm.

(3) Step S303

The normal monitoring route planning unit 12 notifies the communication quality degradation normal monitoring route, which is determined by the calculation, to the forwarding rule configuring unit 13, and sets the forwarding rules for the respective packet forwarding units 21-$i$ (i=1 to n).

(4) Step S304

The normal monitoring route planning unit 12, after setting the forwarding rules, notifies the communication quality degradation normal monitoring route information, and instructs the communication quality measuring unit 14 to start the communication of the monitoring flow for the communication quality degradation normal monitoring route. The communication quality measuring unit 14 measures the communication quality of the monitoring flow on the basis of the communication of the monitoring flow, and then notifies the communication quality result to the communication quality degrading point inferring unit 15.

(5) Step S305

The communication quality degrading point inferring unit 15 infers the quality degradation point from the communication quality result of the monitoring flow.

(6) Step S306

The communication quality degrading point inferring unit 15 verifies whether or not the quality degradation point is inferred.

(7) Step S307

When the quality degradation point is inferred, the communication quality degrading point inferring unit 15 notifies the alarm (warning) to the network management system and the like. At this time, when the quality degradation points are continuously inferred or when they are inferred in the same area within a certain period, the alarm (warning) notification can be omitted.

(8) Step S308

The communication quality degrading point inferring unit 15 notifies the inference result of the quality degradation point to the quality degrading point monitoring route planning unit 16. The quality degrading point monitoring route planning unit 16 acquires the topology information from the topology information acquiring units 11 and determines whether or not the inferred quality degradation point can further define the area, on the basis of the communication quality degradation area locating monitoring route calculation algorithm.

(9) Step S309

If it is determined to be possible, the communication quality degrading point inferring unit 15 determines the communication quality degradation area locating monitoring route, on the basis of the communication quality degradation area locating monitoring route calculation algorithm.

(10) Step S310

The communication quality degrading point inferring unit 15 sets the forwarding rules for the monitoring flow with regard to the communication quality degradation area locating monitoring route, for the respective packet forwarding units 21-$i$ (i=1 to n), through the forwarding rule configuring unit 13.

The quality degrading point monitoring route planning unit 16 notifies the determined communication quality degradation area locating monitoring route to the communication quality measuring unit 14 and instructs the communication quality measuring unit 14 to start the communication of the monitoring flow with regard to the communication quality degradation area locating monitoring route and instructs the communication quality measuring unit 14 to measure the quality degradation (the operational flow proceeds to the step S304).

(11) Step S311

The quality degrading point monitoring route planning unit 16 verifies the presence or absence of the monitoring route having an inclusive relation. Here, the quality degrading point monitoring route planning unit 16 specifies the monitoring route, which includes the set (already-existing) communication quality degradation normal monitoring route and the communication quality degradation area locating monitoring route.

(12) Step S312

The quality degrading point monitoring route planning unit 16 stops to monitor the specified monitoring route.

If the specified monitoring route is the communication quality degradation normal monitoring route, the quality degrading point monitoring route planning unit 16 requests the normal monitoring route planning unit 12 to stop monitoring the communication quality degradation normal monitoring route, and instructs the normal monitoring route planning unit to stop monitoring the communication quality degradation normal monitoring route, under the management of the normal monitoring route planning unit 12.

If the specified monitoring route is a communication quality degradation area locating monitoring route, the quality degrading point monitoring route planning unit 16 requests: the reset of the setting of the communication quality degradation area locating monitoring route; and the communication stop of the monitoring flow to the communication quality measuring unit 14, through the forwarding rule configuring unit 13.

For example, in the examples of FIGS. 4A to 4E, when the monitoring flows F3 and F4 on the communication quality degradation area locating monitoring route are added at the first time, the monitoring flow F1 is understood to be included in the added monitoring flows F3 and F4. Consequently, the monitoring flows F3 and F4 are intended to analyze the monitoring flow F1 in more detail and understood to be able to cover the monitoring area of the monitoring flow F1 from the results of the monitoring flows F3 and F4. Thus, it is understood that the communication (monitoring) of the monitoring flow F1 on the communication quality degradation normal monitoring route may be stopped.

For this reason, the quality degrading point monitoring route planning unit 16 requests the normal monitoring route planning unit 12 to stop the communication of the monitoring flow F1 and instructs the normal monitoring route planning unit to stop the communication of the monitoring flow.

(13) Step S313

The quality degrading point monitoring route planning unit 16 verifies the presence or absence of the unnecessary communication quality degradation area locating monitoring route.

(14) Step S314

When the quality degradation point is solved, the communication quality degradation area locating monitoring route is not required to be monitored. Thus, the quality degrading point monitoring route planning unit 16 determines it as the unnecessary communication quality degradation area locating monitoring route and resets the monitoring flow setting for the communication quality degradation area locating monitoring route. That is, when such a communication quality degradation area locating monitoring route is sensed from the communication quality result notification, through the forwarding rule configuring unit 13, each of the packet forwarding units 21-*i* (i=1 to n) is instructed to reset the setting of the forwarding rules for the monitoring flow with regard to the communication quality degradation area locating monitoring route, and simultaneously with the above reset, the communication quality measuring unit 14 is instructed to stop the communication of the monitoring flow. At this time, the communication quality measuring unit 14 is instructed to resume the suspended communication of the monitoring flow on the communication quality degradation normal monitoring route.

Next, the effect of the second exemplary embodiment will be described.

The second exemplary embodiment is configured such that as compared with the first exemplary embodiment of the present invention, the normal monitoring route planning unit 12 and the quality degrading point monitoring route planning unit 16 are operated in linkage with each other, and the redundant monitoring flows are deleted, which can further decrease the load of the monitoring packet flowing in the network.

<Third Exemplary Embodiment>

Next, a third exemplary embodiment of the present invention will be described below in detail.

This exemplary embodiment is a monitoring method of a passive operation in which a communication for an actual service, not the monitoring dedicated communication, is used as a starting point. Although there is no major modification in the configuration, the operations of the respective units are different.

Figure 8:
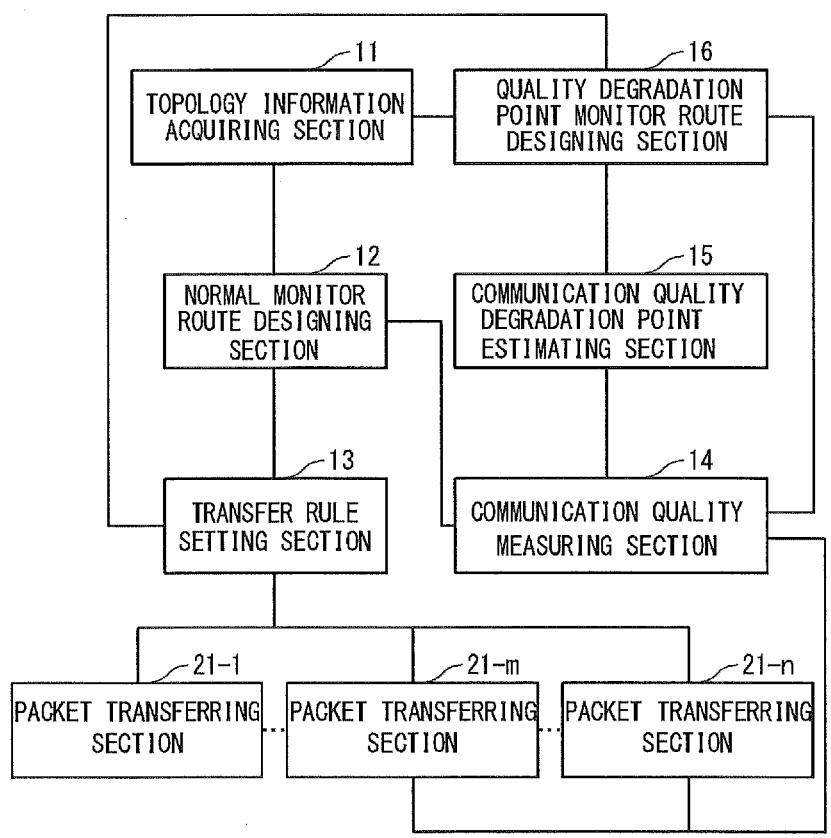
FIG. 8 is a block diagram showing a configuration in a third exemplary embodiment of the present invention.

FIG. 8 shows a communication quality monitoring system of the third exemplary embodiment of the present invention. Here, the portions modified from the first exemplary embodiment of the present invention are described.

In this exemplary embodiment, the differences from the first exemplary embodiment of the present invention lie in the changes in the operations of the topology information acquiring units 11, the normal monitoring route planning unit 12, the forwarding rule configuring unit 13 and the communication quality measuring unit 14. Further, as shown in FIG. 8, the difference lies in the configuration that the topology information acquiring units 11 and the normal monitoring route planning unit 12 may not be operated in linkage.

The topology information acquiring units 11 acquires the topology information. The acquiring method of the topology information and the acquiring timing are similar to those of the topology information acquiring units 11.

When the topology information acquiring units 11 receives the inquiry of topology information from the quality degrading point monitoring route planning unit 16, the topology information acquiring units 11 acquires topology information and notifies the acquired topology information.

When the occurrence of a new communication is notified by the forwarding rule configuring unit 13, the normal monitoring route planning unit 12 determines the communication route as the communication quality degradation normal monitoring route and determines a packet group passing through the communication route as a monitor target flow. The normal monitoring route planning unit 12, when the communication route is determined as the communication quality degradation normal monitoring route, notifies the communication route to the communication quality measuring unit 14 and instructs the communication quality measuring unit 14 to start monitoring the communication quality.

When the finish of the available period of the communication is notified by the forwarding rule configuring unit 13, the normal monitoring route planning unit 12 determines that the corresponding communication quality degradation normal monitoring route is out of the monitor target. The normal monitoring route planning unit 12, when the communication quality degradation normal monitoring route is determined to be out of the monitor target, notifies the determination to the communication quality measuring unit 14 and instructs the communication quality measuring unit 14 to finish monitoring the communication quality.

The forwarding rule configuring unit 13, when receiving the not if cation of an unknown communication from any of the packet forwarding units 21-*i* (i=1 to n), inquires an external route determination server or the normal monitoring route planning unit 12 about the communication route and determines the communication route and then performs a response to the forwarding rules on each of the packet forwarding units 21-*i* (i=1 to n). Consequently, the forwarding rule configuring unit 13 sets the monitoring route for each of the packet forwarding units 21-*i* (i=1 to n).

The forwarding rule configuring unit 13, when determining the communication route based on an inquiry of the communication route to the external route determination server, notifies the communication route as a new communication to the normal monitoring route planning unit 12 and instructs the normal monitoring route planning unit to recognize the communication route as the communication quality degradation normal monitoring route.

The forwarding rule configuring unit 13, when receiving the invalid notification of the forwarding rules from any of the packet forwarding units 21-*i* (i=1 to n), determines whether or not the communication is finished.

The determining method of the finish will be described later.

The forwarding rule configuring unit 13, when determining that the communication is finished, notifies the finish of the valid period of the communication to the normal monitoring route planning unit 12.

The finish of the communication can be determined by various methods. As an example of the communication finish determination, a method of monitoring a connection process of a terminal can be referred to. Further, as another example of the communication finish determination, a method of not sensing the occurrence of the communication in a certain period can be referred to.

The communication quality measuring unit 14 measures the quality by monitoring the target communication, when the communication quality degradation normal monitoring route is notified by the normal monitoring route planning unit 12.

Further, when the communication quality degradation area locating monitoring route is notified by the quality degrading point monitoring route planning unit 16, the communication quality measuring unit 14 transmits the monitoring flow to monitor the communication quality degradation area locating monitoring route to the corresponding packet forwarding unit 21-*i* (i=m to n and measures the communication quality of the monitoring flow.

The communication quality measuring unit 14 notifies the measurement result of the communication quality, which is acquired by the communication monitoring and the measurement based on the monitoring flow, to the communication quality degrading point inferring unit 15.

[Entire Operation of Third Exemplary Embodiment]

Figure 9A:
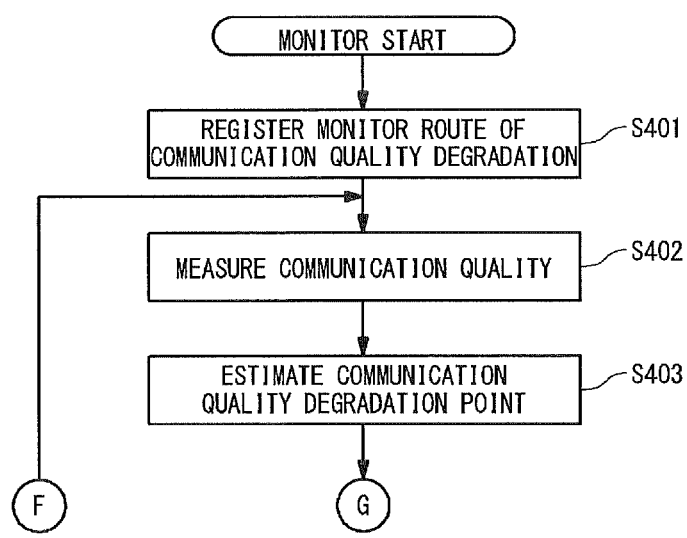
FIG. 9A is a flowchart showing an operation in the third exemplary embodiment of the present invention.

The entire operation of this exemplary embodiment will be described in detail with reference to the flowcharts in FIGS. 9A and 9B.

Figure 10A:
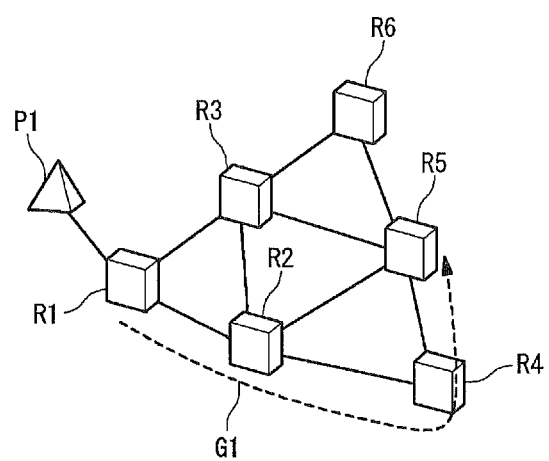
FIG. 10A is a view showing a specific example 1 of the operation in the third exemplary embodiment of the present invention.

Here, for explaining the entire operation in this exemplary embodiment in more detail, the network shown in FIG. 3 is used, and FIGS. 10A to 10C show specific examples. Further, a passive observation result is described under an assumption that it is collected in a probe terminal.

When a user tries to receive a service providing by using a client such as PC and the like, since some of the packet forwarding units 21-$i$ (i=1 to n) does not have the forwarding rules, as an unknown communication, the forwarding rule configuring unit 13 performs an inquiry about the forwarding rules.

(1) Step S401

The forwarding rule configuring unit 13 determines the forwarding rules of the corresponding communication and registers the communication route in the respective packet forwarding units 21-$i$ (i=1 to n). Further, the forwarding rule configuring unit 13 notifies the transfer route of the corresponding communication to the normal monitoring route planning unit 12 as a new communication. The normal monitoring route planning unit 12 registers the corresponding communication route as the communication quality degradation normal monitoring route.

FIG. 10A is a view for explaining the observation of the communication occurrence and the registration of the communication quality degradation area locating monitoring route. For example, in the network shown in FIG. 3, it is assumed that, as shown in FIG. 10A, a communication from the switch R1 to the switch R5 is occurred and the monitoring flow G1 (L1→L4→L8) whose route is a link set {L1, L4, L8} is set. This monitoring flow G1 is registered as the communication quality degradation normal monitoring route.

(2) Step S402

The normal monitoring route planning unit 12 notifies the communication quality degradation normal monitoring route to the communication quality measuring unit 14 and instructs the communication quality measuring unit 14 to measure the quality based on the communication monitoring. The communication quality measuring unit 14 measures the communication quality of the communication quality degradation normal monitoring route.

(3) Step S403

The communication quality measuring unit 14 notifies the quality measurement result to the communication quality degrading point inferring unit 15. The communication quality degrading point inferring unit 15 infers the quality degradation point from the notified quality measurement result.

FIG. 10B is a view for explaining the occurrence of the communication quality degradation and the inference of the communication quality degradation point. For example, in the network shown in FIG. 3, when the quality degradation occurs on L8 as shown in FIG. 10B, the communication quality measuring unit 14 notifies the quality degradation in the communication on the monitoring flow G1 (L1→L4→L8), from the monitored result. Consequently, the communication quality degradation is inferred to be occurred in the link set {L1, L4, L8}.

(4) Step S404

The communication quality degrading point inferring unit 15 verifies whether or not the quality degradation point is inferred.

(5) Step S405

When the quality degradation point is inferred, the communication quality degrading point inferring unit 15 notifies the alarm (warning) to the network management system and the like. At this time, when the quality degradation points are continuously inferred or when they are inferred in the same area within a certain period, the communication quality degrading point inferring unit 15 can omit the alarm (warning) notification.

The communication quality degrading point inferring unit 15 notifies the inference result of the quality degradation point to the quality degrading point monitoring route planning unit 16.

(6) Step S406

The quality degrading point monitoring route planning unit 16 acquires the topology information from the topology information acquiring units 11 and determines whether or not the inferred quality degradation point can further define the area, on the basis of the communication quality degradation area locating monitoring route calculation algorithm.

(7) Step S407

If it is determined to be further definable, the quality degrading point monitoring route planning unit 16 determines the communication quality degradation area locating monitoring route, on the basis of the communication quality degradation area locating monitoring route calculation algorithm.

(8) Step S408

The quality degrading point monitoring route planning unit 16 sets the forwarding rules for the monitoring flow with regard to the communication quality degradation area locating monitoring route, for the respective packet forwarding units 21-$i$ (i=1 ton), through the forwarding rule configuring unit 13.

FIG. 10C is a view for explaining the calculation and additional setting of the communication quality degradation area locating monitoring route and the inference of the communication quality degradation point. For example, in the network shown in FIG. 3, the quality degradation occurs in the monitoring flow G1 (L1→L4→L8) whose route is the link set {L1, L4, L8}. Therefore, as a route for dividing, as shown in FIG. 10C, two monitoring routes of the monitoring flow G2 (=L1→L4→L4→L1) passing through the link set {L1, L4} and the monitoring flow G3 (=L1→L4→L8→L6→L2) passing through the link set {L8} are found. That is, the more detailed area can be specified. Thus, this monitoring route is defined as the communication quality degradation area locating monitoring route, and this communication quality degradation area locating monitoring route is set as the communication route of the monitoring flow.

The quality degrading point monitoring route planning unit 16 notifies the determined communication quality degradation area locating monitoring route to the communication quality measuring unit 14 and instructs the communication quality measuring unit 14 to start the communication of the monitoring flow with regard to the communication quality degradation area locating monitoring route and instructs the communication quality measuring unit 14 to measure the quality degradation (the operational flow proceeds to the step S403).

(9) Step S409

When the transfer rule becomes beyond the scope of a valid time, each of the packet forwarding units 21-$i$ (i=1 to n) sends the invalid notification of the transfer rule to the forwarding rule configuring unit 13. While sensing this notification, the forwarding rule configuring unit 13 verifies the continuity of the communication on a service side and the like and determines whether or not the communication is finished.

If the communication is finished, the forwarding rule configuring unit 13 notifies the finish of the valid time of the communication to the normal monitoring route planning unit 12 and the quality degrading point monitoring route planning unit 16.

(10) Step S410

When the finish of the communication is notified, each of the normal monitoring route planning unit 12 and the quality degrading point monitoring route planning unit 16 deletes the corresponding communication quality degradation normal monitoring route and the corresponding communication quality degradation area locating route from the monitor target flow.

The normal monitoring route planning unit 12 notifies the corresponding communication quality degradation normal monitoring route, to the communication quality measuring unit 14 and instructs the communication quality measuring unit 14 to finish the quality measurement based on the communication monitoring. The quality degrading point monitoring route planning unit 16 instructs to finish the transfer rule of each of the packet forwarding units 21-$i$ (i=1 to n), through the forwarding rule configuring unit 13, for the corresponding communication quality degradation area locating route and notifies the corresponding communication quality degradation area locating route to the communication quality measuring unit 14 and instructs the communication quality measuring unit 14 to stop the communication of the corresponding monitoring flow.

(11) Step S411

Further, the quality degrading point monitoring route planning unit 16 verifies the presence or absence of the unnecessary communication quality degradation area locating monitoring route.

(12) Step S412

When the quality degradation point is solved, the communication quality degradation area locating monitoring route is not required to be monitored. Thus, the quality degrading point monitoring route planning unit 16 determines it as the unnecessary communication quality degradation area locating monitoring route and deletes the monitoring flow setting for the communication quality degradation area locating monitoring route.

That is, when the foregoing communication quality degradation area locating monitoring route is sensed from the communication quality result notification, through the forwarding rule configuring unit 13, each of the packet forwarding units 21-$i$ (i=1 to n) is instructed to reset the setting of the transfer rule for the monitoring flow with regard to the communication quality degradation area locating monitoring route, and simultaneously with the above reset, the communication quality measuring unit 14 is instructed to stop the communication of the monitoring flow.

The above-mentioned quality measurement and quality degradation area locating are repeated, thereby achieving the object of the present invention.

The effects of the third exemplary embodiment will be described below.

In the third exemplary embodiment, the passive monitoring can be carried out as compared with the first exemplary embodiment of the present invention. Thus, while the service is actually provided, the quality can be monitored under the requisite minimum communication quantity.

Figure 11:
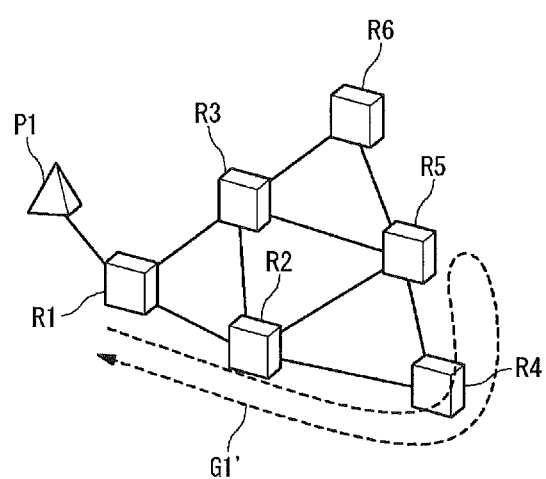
FIG. 11 is a view showing a change example in the operation in the third exemplary embodiment of the present invention.

Further, the third exemplary embodiment is described under an assumption that the passive measurement can be carried out. However, when the passive measurement cannot be carried out, it can be monitored by sending the monitoring flow to the communication quality degradation normal monitoring route, as described in the first exemplary embodiment, instead of the passive measurement. For example, in the specific example in FIG. 10, the monitoring flow G1 (L1→L4→L8) can be replaced with the monitoring flow G1' (L1→L4→L8→L8→L4→L1) as shown in FIG. 11.

[Working Example]

A specific working example for achieving the present invention will be described below with reference to FIGS. 12A and 12B.

Figure 12A:
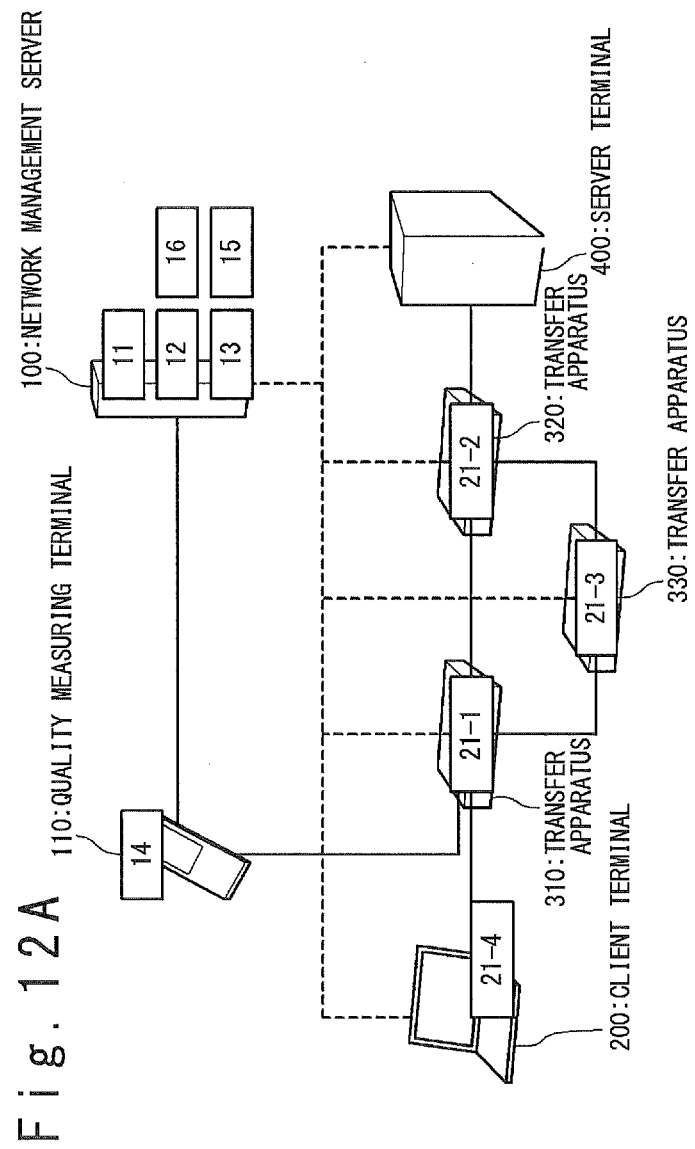
FIG. 12A is a view showing a specific example 1 to for realizing the present invention.

In FIG. 12A, a network system according to a working example of the present invention includes a network management server 100, a quality measurement terminal (probe terminal) 110, a client terminal 200, a transfer apparatus (switch) 310, a transfer apparatus 320, a transfer apparatus 330 and a server terminal 400.

The network management server 100 includes a topology information acquiring units 11, a normal monitoring route planning unit 12, a forwarding rule configuring unit 13, a communication quality degrading point inferring unit 15 and a quality degrading point monitoring route planning unit 16. The quality measurement terminal 110 includes a communication quality measuring unit 14.

Figure 12B:
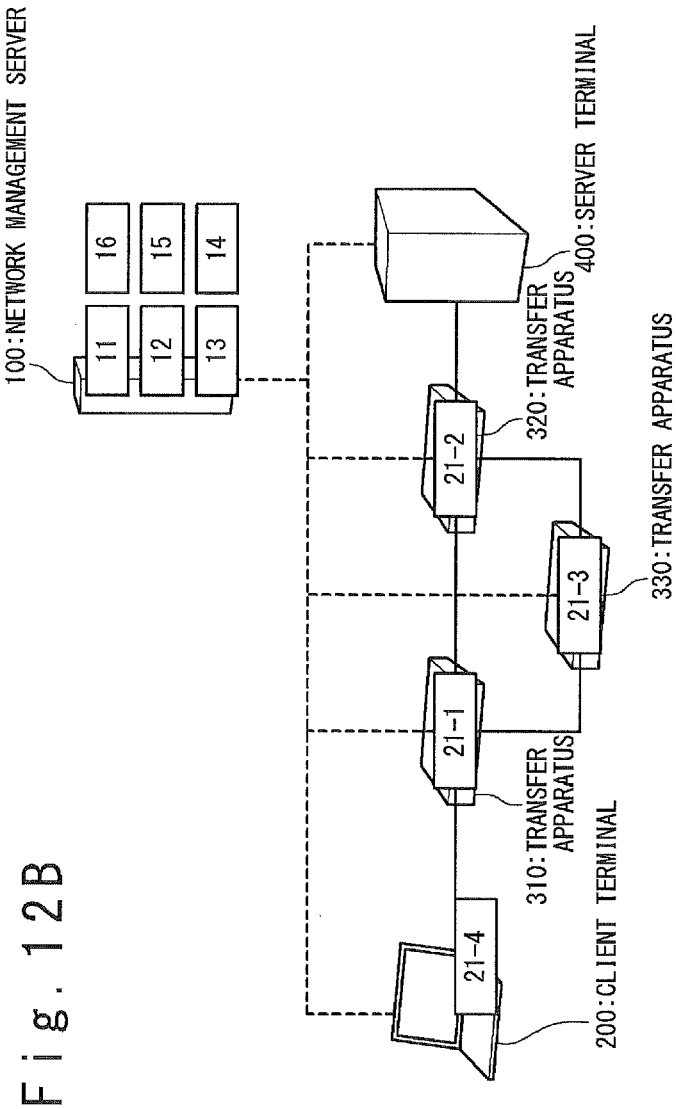
FIG. 12B is a view showing a specific example 2 to for realizing the present invention.

In FIG. 12B, the network system according to the working example of the present invention includes a network management server 100, a client terminal 200, a transfer apparatus 310, a transfer apparatus 320, a transfer apparatus 330 and a server terminal 400.

The network management server 100 includes a topology information acquiring units 11, a normal monitoring route planning unit 12, a forwarding rule configuring unit 13, a communication quality measuring unit 14, a communication quality degrading point inferring unit 15 and a quality degrading point monitoring route planning unit 16.

As shown in FIGS. 12A and 12B, the packet forwarding units 21-$i$ (i=1 to 3) are mounted on the transfer apparatus 310, the transfer apparatus 320 and the transfer apparatus 330. Here, as an example of each of the transfer apparatus 310, the transfer apparatus 320 and the transfer apparatus 330, a switch is assumed. The network configured by a group of these switches form the monitor target network.

Also, the packet forwarding unit 21-4 can also be mounted on the client terminal 200. In this case, it is possible to define the monitor target network with including the corresponding client terminal 200.

As shown in FIG. 12A, the topology information acquiring units 11, the normal monitoring route planning unit 12, the forwarding rule configuring unit 13, the communication quality degrading point inferring unit 15 and the quality degrading point monitoring route planning unit 16 can be generated as a program of one server. The communication quality measuring unit 14 can be mounted as a probe terminal dedicated to the measuring of the quality.

Further, as shown in FIG. 12B, the topology information acquiring units 11, the normal monitoring route planning unit 12, the forwarding rule configuring unit 13, the communication quality measuring unit 14, the communication quality degrading point inferring unit 15 and the quality degrading point monitoring route planning unit 16 can be generated as a program of one server.

Of course, each of them can be hardware-mounted as a dedicated measurement terminal or calculation terminal.

INDUSTRIAL APPLICABILITY

The present invention can be applied to the field such as a network monitoring system for monitoring a quality of a network and notifying quality degradation.

Further, by mounting the function of setting and notifying the degree of quality degradation, the present invention can be applied to the field such as a system for monitoring a trouble of a network apparatus.

Moreover, when the communication quantity of each monitoring flow can be flexibly set and the load of a specific monitoring flow is made high, the present invention can be applied to the field such as a network simulator in which a congestion process is assumed.

CONCLUSION

In conventional communication quality monitoring systems, the system cost for the monitoring operation is high. This is because: the monitoring apparatuses are required to be placed at many portions in the network so that their physical maintenance cost is necessary; the number of the monitoring flows required for monitoring is apt to increase; the cost for the information synchronization between the respective monitoring apparatuses is required; and the network cost to collect information from respective apparatuses is required.

In the present invention, by using the network in which a route can be designed by an external controller as the base and changing the route of the monitoring flow as appropriately, it is possible to perform monitoring of the communication quality under a small number of monitoring terminals and a small number of monitoring flows. In addition, the role of the monitoring flow is divided into the monitoring flow to monitor the occurrence of the quality degradation and the monitoring flow to specify the quality degradation point. Then, the former is used at the normal time, and the latter is used at the time of the quality degradation. Consequently, the network monitoring system that can reduce the system cost is proposed.

The communication quality monitoring system of the present invention is assumed to be a network which mounts the network framework formed by using a packet transfer apparatus in which the packet transfer route can be controlled from an external controller such as the OpenFlow Framework, and includes: a normal monitoring route planning unit for determining a monitoring route to sense the presence of the normal communication quality degradation; a quality degrading point monitoring route planning unit for inferring the degradation point that determines the monitoring route which, when the communication quality degradation occurs, infers the quality degradation point; and a communication quality measuring unit for periodically transmitting or receiving the monitoring packet to and from the designed route and then measuring the communication quality. The system operates such that, under a normal condition, the quality is monitored by using only the minimum required monitoring packets, and when a quality degradation is notified, the monitoring packet for specifying the quality degradation point in detail is added to perform the quality monitoring.

An object of the present invention can be achieved by employing such a configuration and sensing the communication quality while dynamically adjusting the monitoring load.

According to the present invention, it is possible to reduce the number of the monitoring packets flowing in the network. This is because it is sufficient to provide the minimum number of the monitoring packets that are required to verify the occurrence of the quality degradation under a normal condition. Further, even when the quality is degraded, it is enough to communicate the minimum required monitoring packets to specify the portion from the monitored result. For this reason, the comprehensive communication of the monitoring packets is not required.

Further, according to the present invention, the cost to collect the information is reduced. This is because, in addition to the fact that the number of the probe terminals can be reduced similarly to a conventional technique, since the number of the monitoring flows can be decreased to the minimum required number, the information quantity is reduced. Moreover, since the number of the monitoring flows is reduced, the information quantity stored by a probe terminal is reduced. Thus, it can be easily installed in the same apparatus as the inferring apparatus so that it can be treated without additionally flows information in the network.

<Supplemental Notes>

A part or all of the above-mentioned exemplary embodiments can also be described as the following supplemental notes. However, actually, they are not limited to the examples described below.

(Supplemental Note 1)

In a network on which a network framework, which is formed by a packet transfer apparatus whose packet transfer route can be controlled by an external controller, is mounted, a communication quality monitoring system includes:

a normal monitoring route planning unit for determining a normal monitoring route (communication quality degradation normal monitoring route) for sensing an event of a quality degradation occurred in a quality monitor area of a network;

a quality degrading point monitoring route planning unit for determining a monitor communication route (communication quality degradation area locating monitoring route) for narrowing a possible area of the communication quality degradation point to specify a communication quality degradation point when a quality degradation occurs in the network;

a forwarding rule configuring unit for setting each of the monitor communication routes as packet transfer routes;

a communication quality measuring unit for measuring a communication quality by sensing a communication condition of each of the monitor communication routes; and a communication quality degrading point inferring unit configured to infer an occurrence of a quality degradation and an area of the occurrence of the quality degradation based on a result of the measuring of the communication quality.

(Supplemental Note 2)

The communication quality monitoring system according to the supplemental note 1, wherein the quality degrading point monitoring route planning unit further includes a processing unit for deleting a monitor communication route for specifying a defined degradation point area when the quality degradation occurs, when the solution of the quality degradation is verified (resetting the setting of the corresponding monitor communication route as the packet transfer route and put the route to be out of monitoring target).

(Supplemental Note 3)

The communication quality monitoring system according to supplemental notes 1 or 2, wherein the quality degrading point monitoring route planning unit further includes:

a processing unit for determining a redundant monitor communication route, from the monitor communication route to sense an event of the quality degradation occurrence in the quality monitor area in the network and the monitor communication route to specify more defined degradation point area when the quality degradation occurs in the network;

a processing unit for requesting the normal monitoring route planning unit to stop monitoring, in a case of a monitor communication route to sense an event of the quality degradation occurrence in the quality monitor area in the network; and a processing unit for deleting a corresponding monitor communication route, in a case of a monitor communication route to specify a more defined degradation point area when a quality degradation occurs in the network, and wherein the normal monitoring route planning unit further includes a processing unit that stops and resumes monitoring of the monitor communication route to sense an event of the quality degradation occurrence in the quality monitor area in the network from the quality degradation point monitoring route processor.

(Supplemental Note 4)

The communication quality monitoring system according to the supplemental note 3, wherein the quality degrading point monitoring route planning unit further includes a processing unit that resumes monitoring of the monitor communication route to sense an event of the quality degradation occurrence in the quality monitor area in the network, in an area that cannot be covered (put in an area out of the monitoring target) by deleting the monitor communication route to specify a more defined degradation point area when the quality degradation occurs in the network.

(Supplemental Note 5)

The communication quality monitoring system according to any of supplemental notes 1 to 4, wherein the normal monitoring route planning unit further includes a processing unit which, when a communication for a service is occurred, defines the communication route of a communication for the service as the quality monitor area and determines the monitor communication route to sense the event of the quality degradation occurrence in the quality monitor area in the network.

(Supplemental Note 6)

The communication quality monitoring system according to the supplemental note 5, wherein the communication quality measuring unit further includes a processing unit that measures the communication quality by monitoring the communication for the service.

(Supplemental Note 7)

In a network on which a network framework, which is formed by a packet transfer apparatus whose packet transfer route can be controlled by an external controller, is mounted, a communication quality monitoring method, performed by a computer, includes:

determining a normal monitoring route (communication quality degradation normal monitoring route) for sensing an event of a quality degradation occurred in a quality monitor area of a network;

determining a monitor communication route (communication quality degradation area locating monitoring route) for narrowing a possible area of the communication quality degradation point to specify a communication quality degradation point when a quality degradation occurs in the network;

setting each of the monitor communication routes as packet transfer routes;

measuring a communication condition of each of the monitor communication routes as a communication quality; and inferring an occurrence of a quality degradation and an area of the occurrence of the quality degradation based on a result of the measuring of the communication quality.

(Supplemental Note 8)

In a network on which a network framework, which is formed by a packet transfer apparatus whose packet transfer route can be controlled by an external controller, is mounted, a communication quality monitoring program for making a computer performs the method including the followings:

a step of determining a normal monitoring route (communication quality degradation normal monitoring route) for sensing an event of a quality degradation occurred in a quality monitor area of a network;

a step of determining a monitor communication route (communication quality degradation area locating monitoring route) for narrowing a possible area of the communication quality degradation point to specify a communication quality degradation point when a quality degradation occurs in the network;

a step of setting each of the monitor communication routes as packet transfer routes;

a step of measuring a communication condition of each of the monitor communication routes as a communication quality; and a step of inferring an occurrence of a quality degradation and an area of the occurrence of the quality degradation based on a result of the measuring of the communication quality.

As mentioned above, some exemplary embodiments of the present invention have been described in detail. However, actually, the present invention is not limited to the above-mentioned exemplary embodiments. Even in cases where various modifications are applied thereto without departing from the scope of the present invention, such modifications are included in the present invention.

<Remark>

Note that, this application claims the priority based on Japanese patent application number JP2010-192490, and the content disclosed in Japanese patent application number 2010-192490 is included in this application by this reference.

The invention claimed is:

1. A communication quality monitoring system, comprising:

a normal monitoring route planning unit configured to determine a normal monitoring route for sensing an event of a quality degradation having occurred in a quality monitor area of a network formed by a packet transfer apparatus whose packet transfer route is controlled by an external controller;

a quality degrading point monitoring route planning unit configured to determine, when a quality degradation is sensed in the network using the normal monitoring route, area locating monitoring routes that systematically eliminate sections of the normal monitoring route upon which the quality degradation was sensed, for narrowing down possible areas of the normal monitoring route upon which the quality degradation was sensed and to locate, by a process of elimination, a communication quality degradation point along the normal monitoring route upon which the quality degradation was sensed;

a forwarding rule configuring unit configured to set the normal monitoring route and the area locating monitoring routes as packet transfer routes;

a communication quality measuring unit configured to measure a communication quality by sensing a communication condition of the normal monitoring route and the area locating monitoring routes; and a communication quality degrading point inferring unit configured to infer an occurrence of a quality degradation and an area of the occurrence of the quality degradation based on a result of the measuring of the communication quality, wherein:

the normal monitoring route planning unit plans normal monitoring routes for sensing quality degradation occurrences in the network by initially determining a maximum single-stroke link set of links over the quality monitor area that are connectable with a single stroke, the maximum single-stroke link set having a predetermined maximum number of links as elements;

the normal monitoring route planning unit uses the maximum single-stroke link set as a basis for generating additional single-stroke link sets that together with the maximum single-stroke link set, serve as normal monitoring routes to completely cover the quality monitor area to search for the quality degradation in the network; and each single-stroke link set used in a monitoring route has a start point and an end point that coincide, thereby a single probe terminal serves as a single communication quality measuring unit that both sends out monitoring probes and senses for possible quality degradation events occurring in the quality monitor area of the network by receiving the monitoring probes sent out on the monitoring route.

2. The communication quality monitoring system according to claim 1, wherein the quality degrading point monitoring route planning unit resets the area locating monitoring routes when a resolution of the quality degradation is verified.

3. The communication quality monitoring system according to claim 2, wherein the quality degrading point monitoring route planning unit further:

determines a monitoring route which is included in a new area locating monitoring route among the normal monitoring route and an area locating monitoring route as a redundant monitoring route;

requests a stop of a monitor of the normal monitoring route to the normal monitoring route planning unit when the redundant monitoring route is the normal monitoring route; and resets the area locating monitoring route when the redundant monitoring route is the area locating monitoring route, wherein the normal monitoring route planning unit further stops and resumes a monitor of the normal monitoring route in response to the request from the quality degrading point monitoring route planning unit.

4. The communication quality monitoring system according claim 2, wherein the normal monitoring route planning unit further sets a communication route for a service as the quality monitor area and determines the normal monitoring route when a communication for a service is occurred in the communication route for the service.

5. The communication quality monitoring system according to claim 1, wherein the quality degrading point monitoring route planning unit:

determines a monitoring route which is included in a new area locating monitoring route among the normal monitoring route and an area locating monitoring route as a redundant monitoring route;

requests a stop of a monitor of the normal monitoring route to the normal monitoring route planning unit when the redundant monitoring route is the normal monitoring route; and resets the area locating monitoring route when the redundant monitoring route is the area locating monitoring route, wherein the normal monitoring route planning unit further stops and resumes a monitor of the normal monitoring route in response to the request from the quality degrading point monitoring route planning unit.

6. The communication quality monitoring system according to claim 5, wherein the quality degrading point monitoring route planning unit further requests a resume of a monitor of the normal monitoring route of an area which becomes out of a target of monitoring by the resetting of the area locating monitoring route to the normal monitoring route planning unit.

7. The communication quality monitoring system according claim 6, wherein the normal monitoring route planning unit further sets a communication route for a service as the quality monitor area and determines the normal monitoring route when a communication for a service is occurred in the communication route for the service.

8. The communication quality monitoring system according claim 5, wherein the normal monitoring route planning unit further sets a communication route for a service as the quality monitor area and determines the normal monitoring route when a communication for a service is occurred in the communication route for the service.

9. The communication quality monitoring system according to claim 1, wherein the normal monitoring route planning unit further sets a communication route for a service as the quality monitor area and determines the normal monitoring route when a communication for a service is occurred in the communication route for the service.

10. The communication quality monitoring system according to claim 9, wherein the communication quality measuring unit further measures a communication quality of the normal monitoring route by monitoring the communication for the service.

11. A network monitoring method, performed by a computer, said method comprising:

determining a normal monitoring route for sensing an event of a quality degradation occurrence in a quality monitor area of a network formed by a packet transfer apparatus whose packet transfer route is controlled by an external controller;

determining one or more area locating monitoring routes for generating, when a quality degradation is sensed somewhere along the normal monitoring route, at least one area locating monitoring routes for narrowing a precise location of a communication quality degradation point along a portion of the normal monitoring route upon which the quality degradation was sensed;

setting the normal monitoring route and the one or more area locating monitoring routes as packet transfer routes;

measuring a communication quality by sensing a communication condition of the normal monitoring route and the one or more area locating monitoring routes; and inferring an occurrence of a quality degradation and an area of the occurrence of the quality degradation based on a result of the measuring of the communication quality, wherein:

the determination of the normal monitoring route initially determines a maximum single-stroke link set of links over the quality monitor area that are connectable with a single stroke, the maximum single-stroke link set having a predetermined maximum number of links as elements;

the maximum single-stroke link set is used as a basis for generating additional single-stroke link sets that together with the maximum single-stroke link set, serve as normal monitoring routes to completely cover the quality monitor area to search for a quality degradation in the network; and each single-stroke link set used in a monitoring route has a start point and an end point that coincide, thereby a single probe terminal serves as a single communication quality measuring unit that both sends out monitoring probes and senses for possible quality degradation events occurring in the quality monitor area of the network by receiving the monitoring probes sent out on the monitoring route.

12. The network monitoring method according to claim 11, as embodied in a non-transitory computer readable storage medium having stored therein a network monitoring program causing a computer to execute the network monitoring method.

13. A communication quality monitoring system, comprising:
a plurality of nodes interconnected as a network, each node being configured to receive packets whose packet transfer route is controlled by an external controller;
an apparatus configured to measure a communication quality of the network; and
a server having a hardware processor,
wherein the plurality of nodes includes a first node, and
wherein the hardware processor in the server is configured:
to execute a normal monitoring route planning processing to determine a normal monitoring route, which is a route which begins at the first node and ends at the first node and which route includes at least one other node among the plurality of nodes;
to execute a quality degrading region monitoring route planning processing, when a communication quality degradation occurrence is detected when probe signals are transmitted on the normal monitoring route, to narrow down a region within the normal monitoring route where degradation of the communication quality occurs, the quality degrading region monitoring route planning processing then determining a region locating monitoring route intended to focus on one or more portions of the normal monitoring route to attempt to further locate precisely where the communication quality degradation occurs along the normal monitoring route, the region locating monitoring route being shorter than the normal monitoring route;
to execute a forwarding rule configuring processing to set the normal monitoring route and, subsequently, the region locating monitoring route as packet transfer routes; and
to execute a communication quality degrading region inferring processing to infer an occurrence of a quality degradation and a region of the occurrence of the quality degradation based on measurements by the apparatus for each of the normal monitoring route and the region locating monitoring route,
wherein:
the normal monitoring route planning processing plans normal monitoring routes for sensing quality degradation occurrences in the network by initially determining a maximum single-stroke link set of links over a quality monitor area that are connectable with a single stroke, the maximum single-stroke link set having a predetermined maximum number of links as elements;
the normal monitoring route planning processing uses the maximum single-stroke link set as a basis for generating additional single-stroke link sets that together with the maximum single-stroke link set, serve as normal monitoring routes to completely cover the quality monitor area to search for a quality degradation in the network; and
each single-stroke link set used in a monitoring route has a start point and an end point that coincide, thereby a single probe terminal serves as a single communication quality measuring unit that both sends out monitoring probes and senses for possible quality degradation events occurring in the quality monitor area of the network by receiving the monitoring probes sent out on the monitoring route.

14. A communication quality monitoring system, comprising:
a plurality of nodes interconnected as a network, each node being configured to receive packets whose packet transfer route is controlled by an external controller; and
a server configured with a hardware processor,
wherein the plurality of nodes includes a first node,
wherein the hardware processor in the server is configured:
to execute a normal monitoring route planning processing to determine a normal monitoring route, which is a route which begins at the first node and ends at the first node and which route includes at least one other node among the plurality of nodes;
to execute a quality degrading region monitoring route planning processing, when a communication quality degradation occurrence is detected when probe signals are transmitted on the normal monitoring route, to narrow down a region within the normal monitoring route where degradation of the communication quality occurs, the quality degrading region monitoring route planning processing then determining a region locating monitoring route intended to focus on one or more portions of the normal monitoring route to attempt to further locate precisely where the communication quality degradation occurs along the normal monitoring route, the region locating monitoring route being shorter than the normal monitoring route;
to execute a forwarding rule configuring processing to set the normal monitoring route and, subsequently, the region locating monitoring route as packet transfer routes;
to execute a communication quality measuring processing to measure a communication quality when probe signals are transmitted to each of the normal monitoring route and the region locating monitoring route; and
to execute a communication quality degrading region inferring processing to infer an occurrence of a quality degradation and a region of the occurrence of the quality degradation based on the communication quality measuring processing of each of the normal monitoring route and the region locating monitoring route,
wherein:
the normal monitoring route planning processing plans normal monitoring routes for sensing quality degradation occurrences in the network by initially determining a maximum single-stroke link set of links over a quality monitor area that are connectable with a single stroke, the maximum single-stroke link set having a predetermined maximum number of links as elements;
the normal monitoring route planning processing uses the maximum single-stroke link set as a basis for generating additional single-stroke link sets that together with the maximum single-stroke link set, serve as normal monitoring routes to completely cover the quality monitor area to search for a quality degradation in the network; and each single-stroke link set used in a monitoring route has a start point and an end point that coincide, thereby a single probe terminal serves as a single communication quality measuring unit that both sends out monitoring probes and senses for possible quality degradation events occurring in the quality monitor area of the network by receiving the monitoring probes sent out on the monitoring route.

* * * * *